United States Patent [19]

Maxwell et al.

[11] 4,335,426
[45] Jun. 15, 1982

[54] REMOTE PROCESSOR INITIALIZATION IN A MULTI-STATION PEER-TO-PEER INTERCOMMUNICATION SYSTEM

[75] Inventors: Hiram M. Maxwell; Roger E. McKay; Niconedi P. Nacheber, Jr.; Daniel T. Sze, all of Boca Raton, Fla.

[73] Assignee: International Business Machines Corporation, Armonk, N.Y.

[21] Appl. No.: 129,004

[22] Filed: Mar. 10, 1980

[51] Int. Cl.³ ............... G06F 3/04; G06F 15/16; H04M 11/00
[52] U.S. Cl. .................. 364/200; 370/86; 340/825.05
[58] Field of Search ... 364/200 MS File, 900 MS File; 370/86; 340/147 R; 179/2 A

[56] References Cited

U.S. PATENT DOCUMENTS

| | | | |
|---|---|---|---|
| 3,821,713 | 6/1974 | Broadhurst et al. | 364/200 |
| 3,909,782 | 9/1975 | Mazier | 340/146.1 R |
| 3,958,226 | 5/1976 | Kuroda et al. | 364/200 |
| 3,982,061 | 9/1976 | Dorey et al. | 178/2 R |
| 4,007,450 | 2/1977 | Haibt et al. | 364/200 |
| 4,019,176 | 4/1977 | Cour et al. | 364/900 |
| 4,030,073 | 6/1977 | Armstrong, Jr. | |
| 4,031,512 | 6/1977 | Faber | 364/200 |
| 4,051,326 | 9/1977 | Badagnani et al. | 364/900 |
| 4,136,384 | 1/1979 | Okada et al. | 364/200 |

*Primary Examiner*—Gareth D. Shaw
*Assistant Examiner*—Eddie P. Chan
*Attorney, Agent, or Firm*—D. Kendall Cooper

[57] ABSTRACT

For a system including a plurality of processors which are interconnected by a communications link through individual communication stations, a method of remote processor initialization is disclosed which provides a specific frame exchange procedure for the transmission of initial program load data from a source processor to an acceptor processor.

All stations are basically equal. Provision is made in each station to automatically generate a Request Initialization Frame under certain conditions when the attached processor is an acceptor, and for transmitting initial program data transfer frames between a start and a termination frame, when the attached processor is a source. Each station can be set to indicate the type of the attached processor, and to handle initialization frames appropriately.

6 Claims, 13 Drawing Figures

FRAME FORMAT  FIG. 2
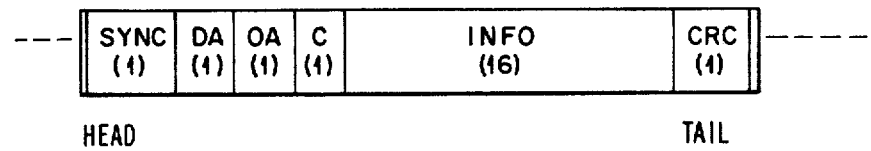
DATA ENCODING
ARBITRARY BYTE  FIG. 3A
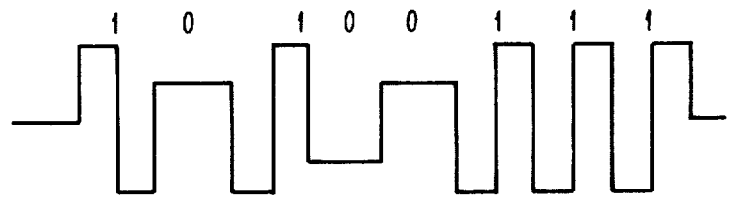
SYNC CHARACTER
WITH AVAILABLE INDICATION:  FIG. 3B
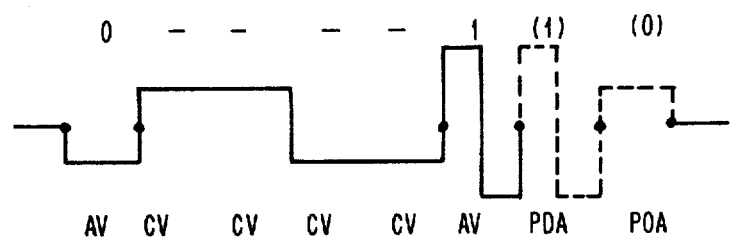
WITH UNAVAILABLE INDICATION:  FIG. 3C
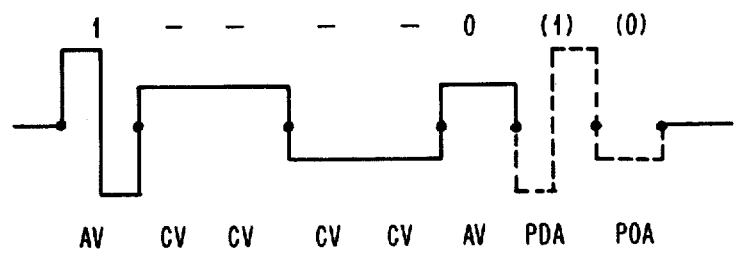

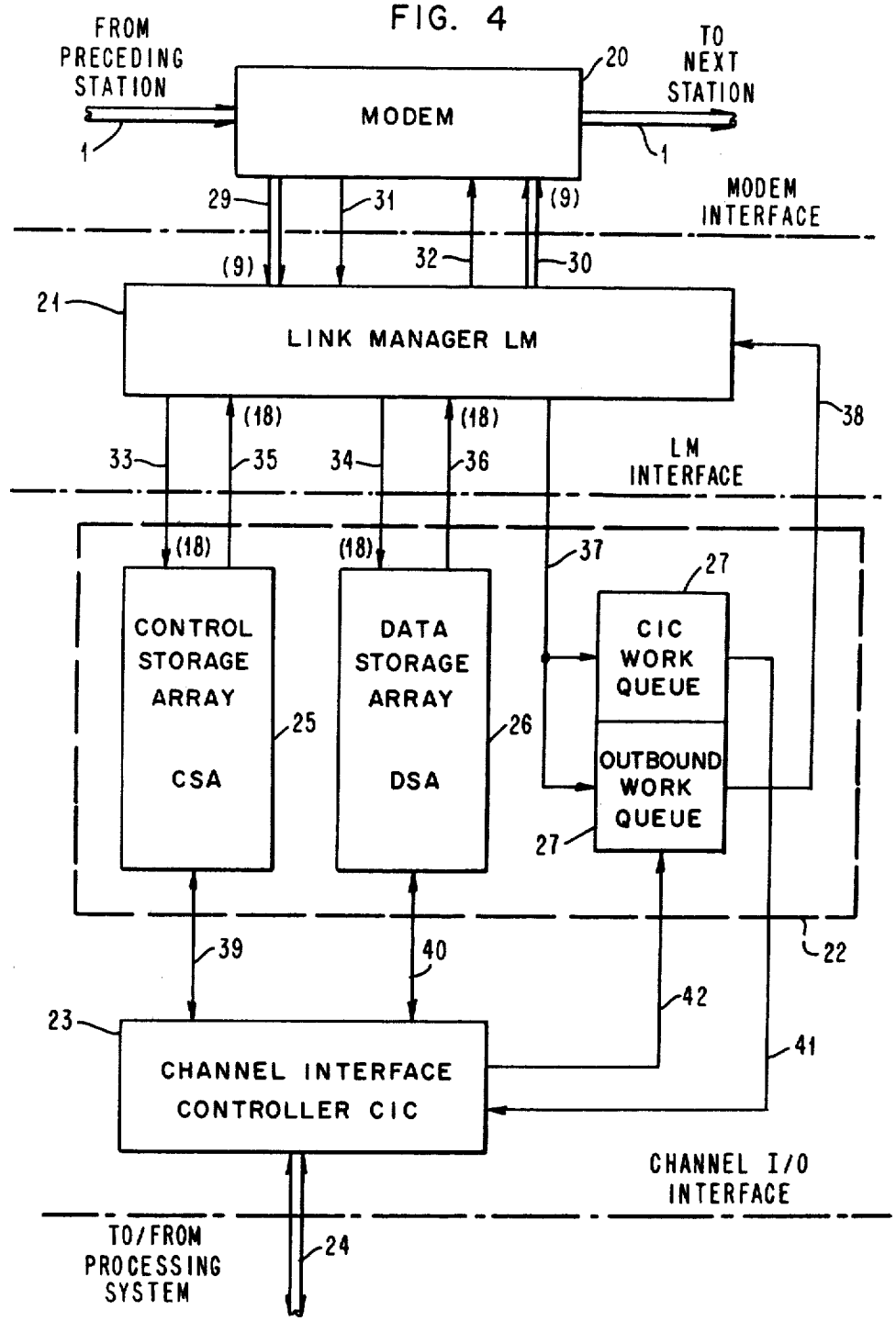

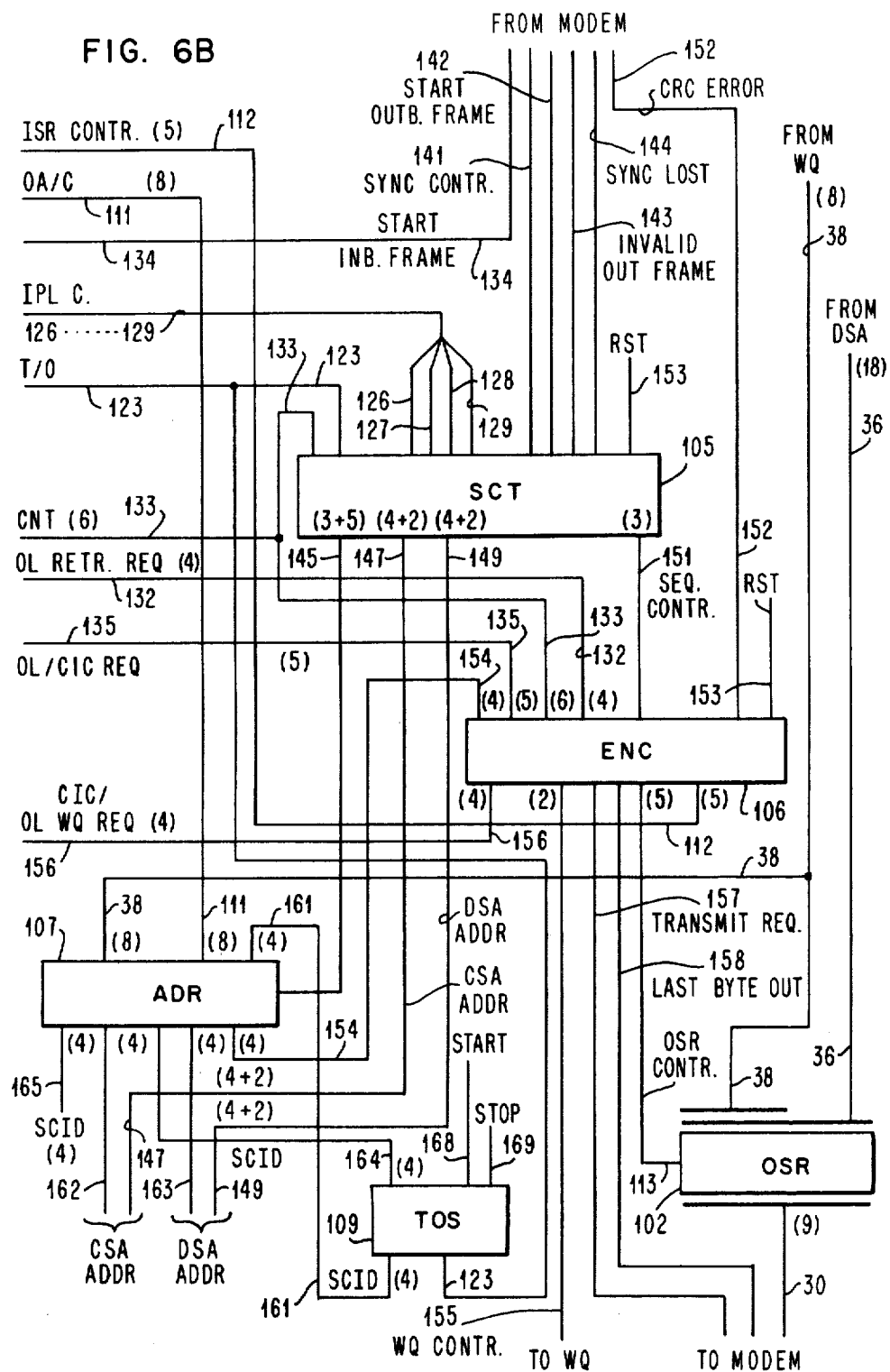

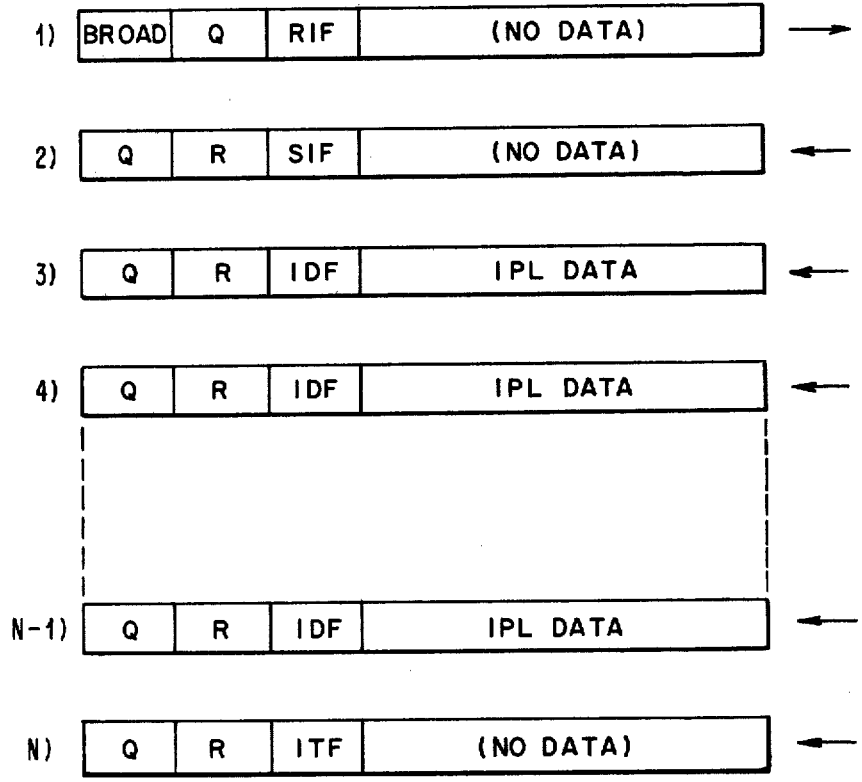

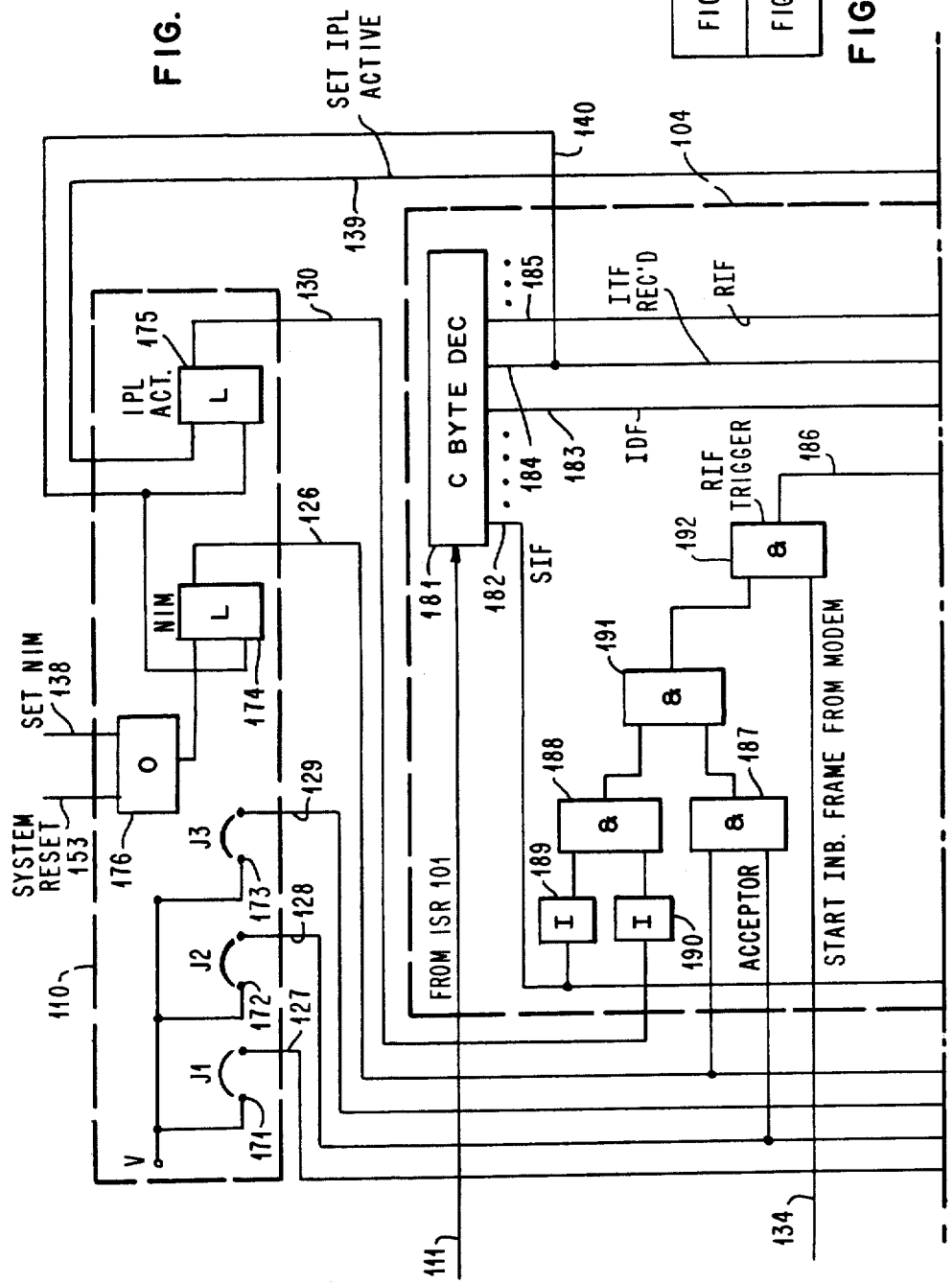

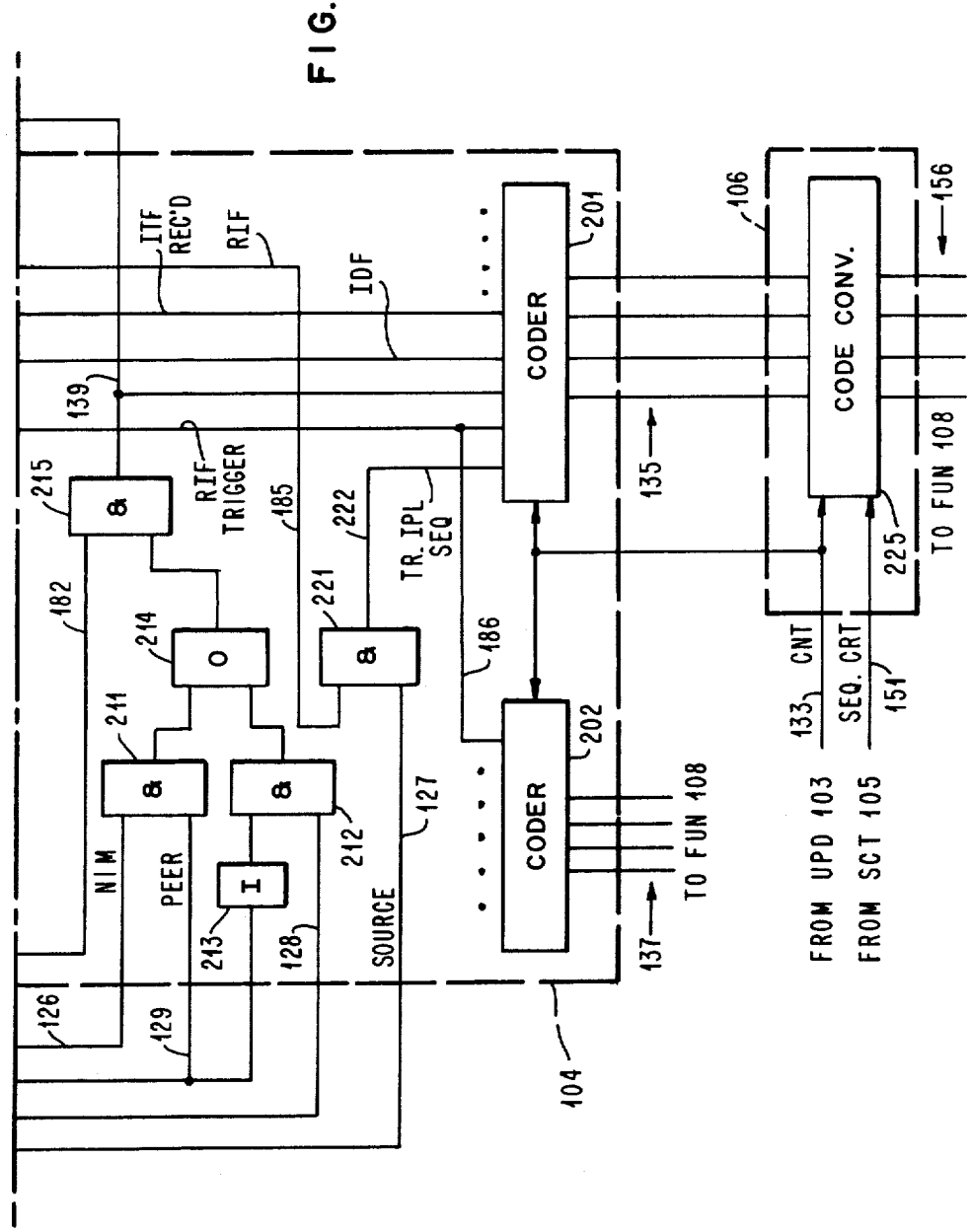

REMOTE PROCESSOR INITIALIZATION IN A MULTI-STATION PEER-TO-PEER INTERCOMMUNICATION SYSTEM

TECHNICAL FIELD

This invention relates to communication systems including a plurality of processors which are each attached to one of a plurality of interconnected stations, and more particularly to a method and means in such a system for remotely loading initialization data from one of the processors into any other of the processors.

CROSS-REFERENCE TO RELATED PATENT APPLICATIONS

The following patent applications are herewith specifically incorporated by reference:
(1) Application Ser. No. 129,052 entitled "Loop Initialization Mechanism for a Peer-to-Peer Communication System", the inventors being Messrs. Jonathan B. Davis et al and
(2) Application Ser. No. 129,053 entitled "Processor Intercommunication System", the inventors being Messrs. Michael I. Davis et al.

BACKGROUND ART

In a system comprising several data processors, each processor must be loaded with an initial program in an operation referred to as Initial Program Load IPL when the system is switched on, or after a power failure.

If the data processors are located remote from each other, an operator would have to be available at each station where an initial program load is required. As in many applications, at least some of the processors in a distributed system could be left unattended most of the time, it would be desirable to have a possibility for remotely initializing processors when the necessity arises, and to utilize the available communication means for this purpose.

In the prior art, some possibilities for initializing a station or processor prior to its operation are described, or basically indicated.

U.S. Pat. No. 4,051,326 to Badagnani discloses an arrangement for remote switching-on and initialization of a data terminal. In this system, a simple ring signal from a remote computer triggers the switching-on of the terminal and the loading of an initialization program which is already available in a peripheral unit of the terminal. A ready signal is returned when the initialization is completed.

In U.S. Pat. No. 4,030,073 to Armstrong, a computer system is described comprising a circuit which, upon turning-on or reenergization of the power supply, transmits address signals which divert the computer to an initialization routine permanently stored in the circuit. This routine includes computer instruction sequences for performing preliminary diagnostic operations and for transferring instructions to main memory from preselected peripherals.

Though both of these systems disclose arrangements for initializing a device automatically under certain conditions, the respective data must be previously available within the station or computer unit which is to be initialized. They both do not provide for the complete remote loading of an initialization program from one computer into another over equal stations which attach the computers in a peer-to-peer fashion to a communication facility interconnecting them. They also do not disclose the automatic requesting, by a computer communication station, of initialization data from a remote device when required.

The Manual "IBM Synchronous Data Link Control—General Information", Form No. GA 27-3093-0 (published March 1974) suggests principles for communication systems in which information is exchanged between stations in the form of formatted frames. Two frame types are proposed for initialization: A Request for Initialization frame which is transmitted by a secondary station to notify the primary station of the need for being set into initialization mode, and a Set Initialization Mode frame which initiates system-specified procedures at the receiving secondary station, for the purpose of initializing link-level functions. An acknowledgement frame is the expected response.

Though the suggested frames are suitable for an information exchange between two stations, there are following limitations: The intended system has a fixed primary station and a number of secondary stations, and no initialization in a system with equal peer-type stations is proposed; the initialization is only for link-level functions, and no complete processor initialization from another processor is involved; and the suggested frames only cover two initial steps while detailed procedures for full initialization are not disclosed but are intentionally left to the respective system in which the two frame types are implemented.

A two-step procedure for transmitting data between a central processor and peripheral devices is disclosed in U.S. Pat. No. 3,909,782 to Mazier. Though the described method and device are suited for controlling the transfer of preparatory information and the transfer of the data proper between two functional units, they do not disclose the exchange of program information between equal stations for initializing one from the other.

One object of the present invention is to provide, in a multi-station communication system interconnecting a plurality of processors, a method and means for loading an initial program stored in one of the processors, into another processor.

Another object is to provide such a system in which any one of the stations can be given the status of an IPL Source station to which the processor holding the IPL data is attached, while any other station can be given the status of acceptor station which can request and accept IPL data for its attached processor from a remote processor.

A further object is to provide a communication system for a plurality of independent processors with provisions for remote initial program loading, in which any station having a processor attached to it that needs IPL data will automatically generate and transmit a request for remote IPL.

Another object of the present invention is a multi-station processor intercommunication system in which for the purpose of remote IPL from a selected source, a station can be given two different acceptor states, so that in one state it must automatically accept an IPL data sequence from a source at any time, while in the other state it can, after a first IPL, select to refuse another IPL data sequence.

These and other objects and advantages of the invention will become more apparent from the following description in which a preferred embodiment is disclosed in connection with drawings.

BRIEF DESCRIPTION OF THE DRAWINGS

FIG. 2 Frame format of data travelling on the loop;

FIGS. 3A, 3B, 3C Signal waveforms of an arbitrary byte and of sync characters travelling on the loop;

FIG. 4 Block diagram of a station connecting a processor to the loop;

FIGS. 6A and 6B (Join as shown in FIG. 6) Block diagram of the link manager in a station;

FIG. 7 Schematic illustration of the frame exchange sequence for remote initial program loading;

FIGS. 8A and 8B (join as shown in FIG. 8) Block diagram showing details of circuitry in the link manager used for initial program loading.

ACRONYMS AND ABBREVIATIONS

Figure 1:
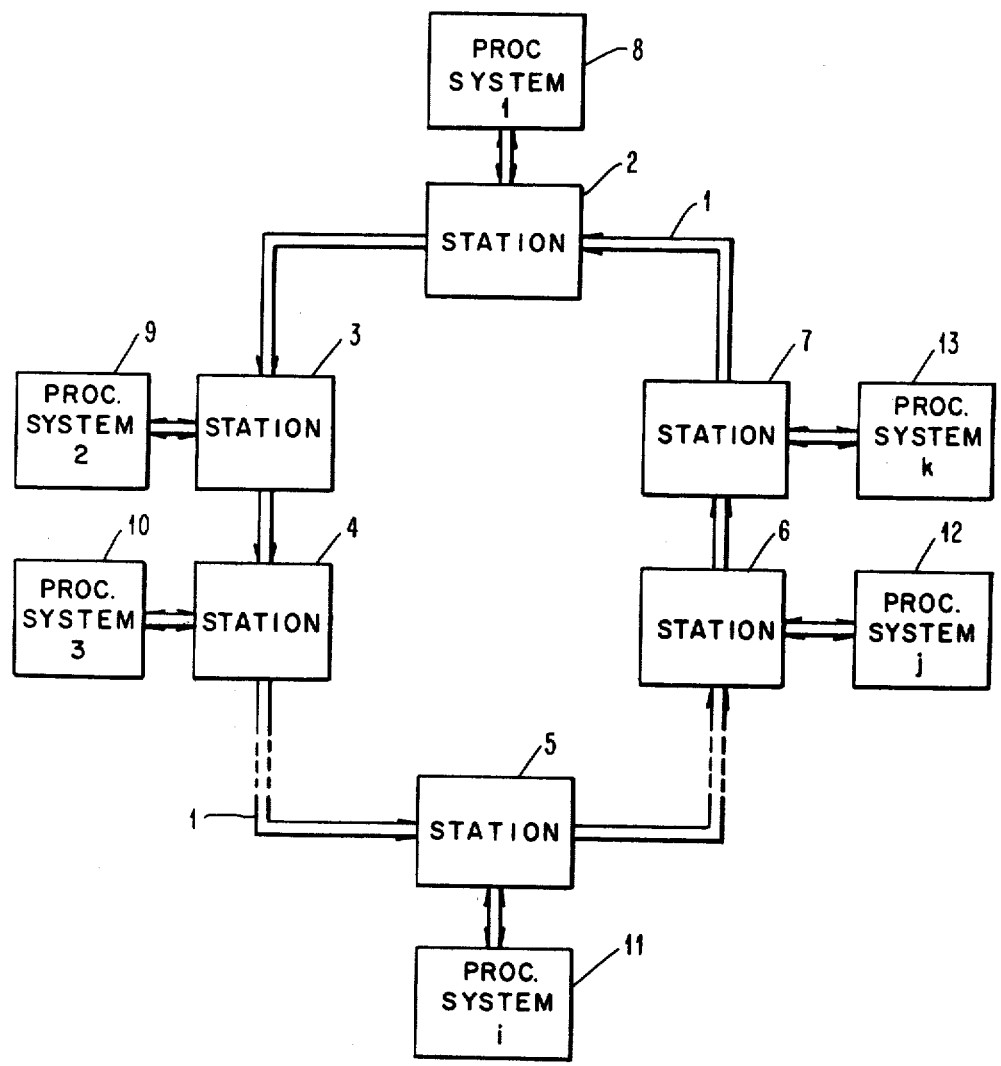
FIG. 1 Configuration of a loop communication system interconnecting a plurality of processors.

The following acronyms and abbreviations are used herein:

A—Frame Available
ADR—Address Register and Funnel
AFD—Addressing and Frame Disposition Circuitry
AV—Availability
B—Broadcast Frame
BFR—Buffer O/I Indicator
C—Control Field (Byte)
CF—Control Frame
CIC—Channel Interface Controller
CNTL—Information Field Length Indicator
CR—Station Receive Sequence Count
CRC—Cyclic Redundancy Check
CS—Station Send Sequence Count
CSA—Control Storage Array
CV—Code Violation
DA—Destination Address
DCB—Device Control Block
DEC—Decoder and Status Monitor
DFF—Data Full Frame
DPF—Data Partial Frame p1 DSA—Data Storage Array
DT—Data Transfer Function Bits
EIPL—External Initial Program Load (Also Termed Remote IPL)
ENC—Work Queue Response and Encoder Unit
FIFO—First In First Out
FUN—Funnelling and Latching Unit
HLD—Hold
HRA—Hold Register Array
IDF—Initialization Data Frame
INFO—Information
INT—Inbound/Outbound Interface Circuitry
I/O—Input/Output
IPL—Initial Program Load
ISR—Input Staging Register
ITF—Initialization Termination Frame
LM—Link Manager
LTC—Link Transfer Count
M—Match
NIM—Non-Intelligent Mode
NOM—Normal Operating Mode
NS—Non-Sequenced Function Bits
NSI—Non-Sequenced Information Frame
NSR—Non-Sequenced Response Frame
OA—Origin Address
OSR—Output Staging Register
PDA—Destination Address Parity
POA—Origin Address Parity
R—Regulatory Function Bits
RA—Data Retry Address
RCC—Receiver Clock and Control Circuitry
RE—Reserve Bit
R/F—Response Required Final Bit
REJ—Reject Output (or Input) Remote
IPL—Same As External Initial Program Load (EIPL)
RES—Response
RIF—Request Initialization Frame
S—Sync Byte Indicator
SCID—Subchannel Identification
SCT—Sequence Controller
SF—Status Frame
SIF—Set Initialization Frame
SSF—Station State Field
SYNC—Synchronization
TED—Transmitting Encoder and Driver Circuitry
TOS—Time-out Stack
UPD—Updating Unit
VLD—Variable Length Delay Storage
WD—Word
WQ—Work Queue
WQS—Work Queue Storage
X—Reserve (Not used)

DESCRIPTION OF A PREFERRED EMBODIMENT

The specification disclosing a preferred embodiment of the invention is partitioned into ten sections:

1. General facts of the system. 2. Principles and control of frame transmission. 3. Frame types and formats. 4. The station. 5. The modem. 6. The storage section. 7. The channel interface controller. 8. The link manager. 9. Intersystem initialization procedure. 10. Link manager details and operation for remote initial program loading.

1. GENERAL FACTS OF THE SYSTEM 1.1 Definitions

The communication system to be described has a demand-response structure which provides transparency and code independence. Information is transmitted in fixed length units called frames. The physical mechanism that transmits and receives information is called a station. The communication line which carries information from one station to the next is called a link. Frames initiated by a given station to be transferred to another station are called demand frames. On receiving a demand frame or frames, the station must acknowledge the receipt with either a frame called response frame, or another demand frame. Each frame transmitted contains checking information which is used for error detection and subsequent recovery when required. The demand-response approach provides flexibility necessary for conveying procedures to control the transmission of information over different physical communications facilities. On top of the demand-response structure, a structure of command, data, and status is further mapped to provide a protocol between processors. Basic terms used in understanding the remainder of this specification are briefly defined below. More terms will be defined as the document progresses.

*Station:* A message source and a sync point in the data transmission system.

*Link:* The data transmission channel that interconnects two or more stations.

*Loop or Ring:* A link carrying a one way transmission that begins at a given station, traverses through one or more stations, and returns to the given station.

*Frame:* The basic unit of information transfer from one station to another.

*Demand Frame:* The information frame initiated by a given station to be transmitted to another station.

*Response Frame:* The receipt of a demand frame or frames by a station must be countered with an acknowledgement. The acknowledgement frame is the response frame.

*Host Processing System:* Host Processing system is that unit which is connected to the other side of a station, usually via the Channel I/O interface of the processing system.

*Local Station:* The local station to a given host processing system is that unit which is directly attached to the Channel I/O interface of the host processing system. The host processing system physically communicates to all other stations via its local station.

*Subchannel:* The subchannel is the physical subdivision of a local station which logically forms part of a station elsewhere on the link. It contains the control words and buffering necessary to effect data transfers between the two stations. Each local station contains a subchannel for each station attached to the link.

*Device Control Block/DCB:* A block of control information residing in a station and containing the current parameters for the operation just executed.

*External Initial Program Load/EIPL:* A procedure by which the initial program load IPL for one station can be effected from another station upon request. Also termed: *Remote IPL.*

1.2 Purpose and Basic Structure of the System

FIG. 1 shows the basic structure of a processor intercommunication system in which the invention finds application. A serial loop 1 interconnects a plurality of stations 2, 3 . . . 7. To each station, a host processing system 8, 9 . . . 13 is attached. The processing systems may be of different sizes and structures, and they may be general purpose systems or adapted for a specific application. There is no central station or controller in the system.

Signals on the loop propagate in one direction, as indicated by the arrows, either bit-serial or byte-serial, depending on the requirements of the particular system and the physical link chosen. The specific embodiment described in this specification provides bit serial transmission.

The main purpose of this processor intercommunication system is to provide a single mechanism for high-speed storage to storage data transfer between two or more processing systems or subsystems. It also allows incremental adding of processing power into an overall processing system, thus achieving a fully distributed multi-processing system. It is mainly intended for in-house local interconnections.

1.3 Frame Format

Data are transferred on the loop in the form of consecutive frames. The format of such a frame is shown in FIG. 2. Each frame comprises twenty-one eight-bit bytes or characters. They contain the following information:

Synchronization SYNC (1 byte): The sync field identifies the beginning of a frame. Since frames are contiguous, the sync field indirectly identifies the termination of a previous frame. The sync field also indicates accessibility of the frame, i.e. it contains an available/unavailable indication. Details of the sync field are explained in a later section.

Destination Address DA (1 byte): An eight-bit destination address identifying the intended receiving station of the respective frame.

Origin Address OA (1 byte): An eight-bit origin address identifying the originating or sending station of the respective frame.

Control C (1 byte): An eight-bit control field used by the sender of the respective frame to convey its internal state information, or identifying the content category of the information field, e.g., whether the information field contains status, response, instructions, or data. It also contains information pertaining to the extent in which the information field is filled. More details about the control field functions will be given in a later section.

Information Field INFO (16 bytes): The information field comprises 16 bytes containing either data, status information, or control information. In some frames, this field may be empty or partially filled depending on the specification of the control field.

Cyclic Redundancy Check CRC (1 byte): A check character generated from the contents of the four fields DA, OA, C, and INFO.

The sync character SYNC and the check character CRC are physical frame parameters. The other four fields, i.e. DA, OA, C, and INFO, contain logical frame parameters. The physical frame parameters are those parameters that are technology dependent and are used to validate and extract the logical frame parameters. They vary with the specific system implementation chosen. Only one embodiment example will be described in this specification, though many others are possible.

2. PRINCIPLES AND CONTROL OF FRAME TRANSMISSION 2.1 Addressing Convention

Recognition of a valid destination address and a valid origin address is required by the receiving station prior to the acceptance of a frame.

A station must accept at least two different destination addresses. One of the addresses is a broadcast address. The broadcast address may not be used in the Origin Address field. The other address is the address or addresses assigned a given station which must uniquely identify that station on the link. The address uniquely identifying the station on the link is said to be the station address. The station having either data or responses to transmit under normal operation mode must use the appropriate station address.

2.2 Station Modes

Normal Operating Mode NOM

Normal Operating Mode NOM is the station operational mode for information interchange. Being in NOM mode implies that this station is "up and running", i.e., the processing system is connected and may intelligently send or receive messages.

Non-Intelligent Mode NIM

Non-intelligent Mode NIM is the mode where the station has a machine malfunction and hence has to be reinitialized, or the station and the attached processing system has just been powered up, or the processing system has yet to be initialized. All frames, except for a Set Initialization Frame SIF (cf. Section 3.4) received while the station is in NIM mode will be ignored. The response for these frames received will be a broadcast Request Initialization Frame RIF (cf. Section 3.4). The station exits NIM mode to NOM mode on receiving any command from the I/O interface. The station's modem, however, will evaluate all frames for achieving and maintaining synchronization (even in NIM mode).

2.3 Transmit/Receive Procedure

There has to be an orderly procedure to determine when each station in the loop can output messages onto the loop: otherwise, the transmission would be garbled. The procedure goes as follows:

- The station transmits the information provided by the attached processing system only if the station has declared to be in synchronization.
- The station transmits only on frames that either are marked as available, or have their destination address/origin address equal to the station address. Frames transmitted by this station must be marked as unavailable if the station has inserted information.
- Frames arriving at the station having their destination address or origin adress equal to the station address will be re-marked as available if the station has no information to transfer.
- The station always listens to information arriving on the link. Information is peeled off only when the destination address equals the station address.
- A demand frame or frames transmitted must be responded to with either another demand frame or a response frame.

2.4 Invalid Frame

An invalid frame is one that is received in one of the following conditions: (a) It is received during un-synchronized state, (b) when the check character declares the frame just received to be invalid, or (c) when the frame is perceived to contain code or modulation violations in areas other than sync character location. All invalid frames received will be discarded with no further examination.

2.5 Frame Synchronization

A station is considered synchronized when the station can correctly predict the arrival of the synchronization character and the check character. Furthermore, the check character must be able to declare the frame to be free of error.

The procedure for synchronization is as follows:

(a) A sync counter which counts modulo 4 (from zero to 3) is initialized to zero.

(b) The sync character detection circuitry continuously scans the input bit stream for the sync code. If the sync counter value is less than 3, each sync character detected causes the CRC to be compared for a valid frame. A valid frame detected causes the sync counter to be incremented by 1. An invalid frame detected causes the sync counter to be decremented by 1. This process continues until the sync counter equals 3 or 0.

(c) When the sync counter equals 3, the station is to be in frame sync. Frame sync is maintained if valid sync characters are received at proper time intervals.

(d) When the sync counter equals 0, the station is said to be out of frame sync.

More details on the frame synchronization procedure are given in section 6.

2.6 Sync Field/Signal Format

The eight bits of a sync field have the following functions:

| Bit No.: | 0 | 1 | 2 | 3 | 4 | 5 | 6 | 7 |
|---|---|---|---|---|---|---|---|---|
| Function: | AV | CV | CV | CV | CV | AV | PDA | POA | where

AV = availability bit (pair 01 = available, pair 10 = unavailable)
CV = code violation bit
PDA = destination address parity
POA = origin address parity As shown, the actual sync information occupies bits 1-4 of the sync character, while the frame availability information is provided in bits 0 and 5. Bits 6 and 7 are parity check bits for the two address fields Destination Address DA and Origin Address OA. If a bifrequency signal format is used as shown in FIG. 3A, the appearance of sync characters with either available or unavailable indication is as shown in FIGS. 3B and 3C. The unique violation of the bifrequency format in bit positions 1-4 is easily recognizable.

3. FRAME TYPES AND FORMATS

3.1 Control Field Functions

The control field specifies one of three demand or response frame types: Data Transfer, Regulatory, and Non-Sequenced. The formats of the control field for these three frame types are as follows:

| Bit Assignment | C0 | C1 | C2 | C3 | C4 | C5 | C6 | C7 |
|---|---|---|---|---|---|---|---|---|
| Data Transfer | 0 | I/O | DT | DT | CS | CS | CR | CR |
| Regulatory | 1 | 0 | R | R | CS | CS | CR | CR |
| Non-Sequenced | 1 | 1 | RE | R/F | NS | NS | NS | NS |

The various bits have following functions:

CS = Station send sequence count:

This is a two bit counter that is used to number all frames transferred under the normal operating mode. This numbering allows for transmission of up to 3 contiguous frames prior to receiving responses for these frames. It is also a means for error detection and recovery.

CR = Station receive sequence count:

This is a two bit counter used in conjunction with the CS count for error detection and recovery. The numbering is used only under normal operating mode.

I/O = Input/Output bit:

This bit is used to associate the frame transmitted with the operation currently residing in the station. A logical zero indicates input, while a logical one indicates output.

DT = Data transfer function bits:

These bits are used to define four types of data transfer frames.

RE = Reserve bit.

R = Regulatory function bits:

These bits are used to define four types of regulatory frames. These regulatory frames are used to regulate data transfer across stations.

NS = Non-sequenced function bits:

These bits are used to define frames operating under initialization state, abnormal condition states, etc.

R/F = Response required final bit:

The R/F bit is used in non-sequenced formatted frames to solicit responses. Since non-sequenced frames, except those that are intended for initialization, are passed directly to the system programs above, it therefore is the function of the system above the station to provide proper response to frames containing the final bit.

3.2 Data Transfer Format

The data transfer frames are primarily the frames used to carry messages from one processing unit to another. They are also used to carry the control and the status messages concerning the transmit and the receive stations. All data transfer frames are considered to be demand frames.

The data transfer format may be used only under the normal operating mode. There are four data transfer frame formats possible. These include:

| Data Transfer Frames | C2 | C3 |
|---|---|---|
| Data full frame = DFF | 0 | 0 |
| Data partial frame = DPF | 0 | 1 |
| Control frame = CF | 1 | 0 |
| Status frame = SF | 1 | 1 |

Data Full Frame DFF format indicates that the information field is filled with 16 bytes of data. Message transfer always begins with DFF frames unless the message is less than 16 bytes. The I/O bit must be equal to a logical one for the DFFs.

Data Partial Frame DPF format indicates that the information field has less than 16 bytes of data. The first two bytes of the information field contains a byte count indicating the toal number of data bytes in the information field. The data may be less than 16 data bytes but the frame must still be stuffed, with logical zeros if necessary, to make up a 16 byte field. The I/O bit must be equal to a logical "one" for the DPF sent.

The Control Frame CF format is intended for initiating a transfer between stations. Instead of containing data as in DFF and DPF, the information field contains 16 bytes of control information.

The I/O bit in this case should be a logical "zero" for "read op" and a logical "one" for "write op". Commands are transferred or re-transferred from the processor under the control frame.

The Satus Frame SF format is used as a response concerning acceptance or non-acceptance of the demand made in a control frame. The SF format is also used for station status exchange in the termination of data transfer. In both cases, the status frame is used to provide station status information to the corresponding station engaged in a data exchange, or wishing to make a data exchange, i.e. proceed with exchange. The status information is contained in the first byte of the information field. The subsequent bytes contain logical zeros.

The I/O bit should be a logical "zero" if the status frame is initiated due to a "read op" resident in the sending station, and a logical "one" if the status frame is initiated due to a "write op" resident in the sending station. For cases where a status must be provided but no specific read or write op is active, the first byte (byte 0) of the information field INFO in a status frame is formatted as follows:

| Bits | | | | | |
|---|---|---|---|---|---|
| 0 | 1 | 2 | 3 | 4 | |
| 1 | | | | | Sequence Check |
| | 1 | | | | Data Check |
| | | 1 | | | Byte Count LO |
| | | | 1 | | Byte Count HI |
| | | | | 1 | Hardware Error |

| Bits | | | |
|---|---|---|---|
| 5 | 6 | 7 | |
| 0 | 0 | 0 | Normal |
| 0 | 0 | 1 | Station Busy |
| 0 | 1 | 0 | Operation Reject |
| 0 | 1 | 1 | Valid Frame, Station Subchannel Inactive |
| 1 | 0 | 0 | Non-Sequenced Received, no active DCB |
| 1 | 0 | 1 | Non-Sequenced Frame Terminate, with active DCB |
| 1 | 1 | 0 | Sequenced Read Request w/o DCB |
| 1 | 1 | 1 | Sequenced Write Request w/o DCB |

Sequence Check implies that a protocol sequence error had occured on the link and is not to be confused with sequence count errors which are data check errors.

Data Check implies that data did not arrive at the intended station correctly, hence no response was received for the data frame or frames sent within the time out limits. Data Check is brought up only after the passage of the control sequence for the command transfer.

Byte Count Lo implies that the data byte count specified in the DCB is less than that received.

Byte Count Hi refers to the condition where the data byte count specified in the DCB in more than that received in the data transfer.

Operation Reject refers to the condition where both stations attempting to provide an exchange are given an incompatible set of commands, e.g., Write command in station A, and Write command in station B.

Hardware Error refers to a hardware error encountered in the local station while making an exchange.

Station Busy refers to the condition where the station has received a command frame from another station prior to the posting of the current DCB.

Non-Sequenced Frame Terminate refers to the condition where the station received a non-sequenced frame while in the midst of data frame transfer, hence terminating the data transfer DCB residing within the station.

Sequenced Read Request without a DCB refers to the state where an outstanding read request was received from a station on the loop and no DCB is presently active in the station to direct proper interaction required of the Read request.

Sequenced Write Request without a DCB: Like the status code point above this status decode refers to a write request instead.

Non-Sequenced Received No Active DCB: Like the status code point above, this refers to a non-sequenced frame instead.

Valid Frame, Subchannel Inactive implies that either an SIF was received by a station configured for station-to-station external initial program load EIPL or any valid frame except SIF was received while the station is in NOM mode with the subchannel inactive.

3.3 Regulatory Format

The regulatory format, as the name implies, is used to regulate information flow between stations involved in an exchange. The regulatory format hence is used in conjunction with the data transfer frames operating under the normal mode. The four types of regulatory frames are:

| Regulatory Frames | | C2 | C3 |
|---|---|---|---|
| Reject Output | = REJ | 1 | 1 |
| Reject Input | = REJ | 1 | 0 |

-continued

| Regulatory Frames | | C2 | C3 |
|---|---|---|---|
| Hold | = HLD | 0 | 1 |
| Response | = RES | 0 | 0 |

A Reject REJ frame is used by the receiving station to return an error sequence indication prior to the "link up" between the two stations for data transfer. An example is the receiving of a data frame prior to the station being primed with a Device Control Block DCB. Reject Output is issued with respect to an output operation received while Reject Input is issued against an input operation received.

A Hold HLD is for the purpose of indicating a temporary indigestive condition within the station. The usual problem is the lack of buffer space or inability of the processing unit to respond to the data accumulated within the station. The station that has been given a Hold will wait for a response frame prior to continuing the data transfer.

A Response RES frame is used to denote that the station has received data and that the data frames previously received as indicated by the sequence count are in good condition.

The information field in a regulatory frame is ignored.

3.4 Non-Sequenced Format

The non-sequenced format is intended either for direct processor-to-processor communication with little or no intervention on the part of the station, or for system initialization. It will be used for processor-to-processor control transfer. There are no sequence counts associated with each frame transferred. If a response is required by the sender, the non-sequenced frame transmitted by the sender must have the Response Required Final bit turned on. The receiver, or the receiving processor must, in this case, provide a response. The non-sequenced format is intended for system use, not for the applications programmer.

The station in receiving a non-sequenced frame except for the Initialization Data Frame will transfer the Origin Address field, the Control field and the entire data field to the host attachment or processing system. The non-sequenced formats are:

| Non-Sequenced Frames | | C4 | C5 | C6 | C7 |
|---|---|---|---|---|---|
| Initialization Data Frame | = IDF | 0 | 0 | 0 | 0 |
| Set Initialization Frame | = SIF | 0 | 0 | 0 | 1 |
| Request Initialization Frame | = RIF | 0 | 0 | 1 | 0 |
| Non-Sequenced Information Frame | = NSI | 0 | 1 | 0 | 0 |
| Non-Sequenced Response Frame | = NSR | 0 | 1 | 0 | 1 |
| Initialization Termination Frame | = ITF | 0 | 0 | 1 | 1 |

Initialization Data Frame IDF is used only when the station is reserved for EIPL (station-to-station external initial program load). The IDF is the only non-sequenced format frame where only the information field is transferred to the processor storage. The station receiving IDF is presently operating under NIM mode. Should this frame be received under NOM mode, the station will pass the frame to the processor as if it were a non-sequenced information frame NSI.

Set Initialization Frame SIF is used for EIPL allowing the EIPL host to notify the intended stations that EIPL procedure will start. There is no data field associated with this frame.

Request Initialization Frame RIF is the response frame generated by the station when confronted with demand frames prior to EIPL. RIF is also the demand frame resulting from IPL at power on and the encountering of any frames except initialization frames while in NIM mode. The only time the RIF is in use is while the station is in NIM mode. There is no data field associated with this frame. The receiver of this frame, being in NOM mode, will pass the frame to the processor as if it were an NSI frame.

Non-Sequenced Information Frame NSI is used for processor-to-processor communication without having to go through the normal data path. Depending on the host attachment's channel interface structure, the NSI frame may be transferred to the processor through data paths other than the normal cycle steal path.

Non-Sequenced Response Frame NSR is used as a response frame to a non-sequenced frame when the Response Required Final bit is encountered. There need not be a data field associated with this frame.

Initialization Termination Frame ITF is the last frame to be transferred in an initialization sequence. ITF is used to signal the station that all required initialization data has been transferred. There is no data field associated with this frame.

It should be noted that the term "initialization" in this section means loading of IPL data into a station's storage to enable its operation. This is different from loop initialization in which only the station modems are involved and which is necessary to get stations synchronized with loop operation, but does not involve the exchange or loading of data.

4. THE STATION 4.1 Basic Structure and Component Functions

Each of stations 2-7 of FIG. 1 is partitioned into four functional sections, namely a Modem 20, a Link Manager LM 21, a Storage Section 22, and a Channel Interface Controller CIC 23 as shown in FIG. 4. Channel Interface Controller 23 is connected to an I/O channel of the attached processing system by Channel Bus 24. Modem 20 is connected into communication loop 1 which is also termed "link" in the following.

Modem 20 handles technology dependent functions such as:
Information coding and modulation,
Link drive and receive,
Frame synchronization and data insertion,
Clock extraction,
Frame and data checking at the link level,
Link initialization and available frame insertion.
The Modem is described in more detail in section 5.

Link Manager LM 21 provides logical frame management functions such as:
Frame Structuring,
Address decode and encode,
Control field encode and decode,
Data blocking and deblocking,
Physical interface protocol sequencing and checking,
Data pacing.

Channel Interface Controller CIC 23 is the mechanism which interfaces the station with the processor I/O channel. It provides 16 subchannels for communication with up to 16 stations, and further provides functions such as:
Synchronizing with the channel I/O interface for data transfer,
Presenting the station logical interface to the processor, Multiplexing control required amongst the 16 subchannels, Device address mapping between the processor I/O interface and the station address.

Storage Section 22 comprises the following units: a Control Storage Array CSA 25, a Data Storage Array DSA 26, and Work Queue Storage WQS 27 for a CIC work queue and an outbound work queue.

Modem 20 and Link Manager 21 are interconnected by Inbound Data Bus 29, Outbound Data Bus 30, Control Lines In 31 and Control Lines Out 32.

Link Manager 21 and Storage Section 22 are interconnected by Control Array Input Bus 33, Data Array Input Bus 34, Control Array Output Bus 35, Data Array Output Bus 36, and further by Work Queue Bus In 37 and Work Queue Bus Out 38.

Channel Interface Controller CIC 23 is connected to CSA 25 by Control Store Bus 39, to DSA 26 by Data Store Bus 40, and to WQS 27 by Queue Output Bus 41 and Queue Input Bus 42.

As indicated in FIG. 4, there are three important interfaces in the station: The Modem Interface between Modem 20 and Link Manager 21, the Link Manager Interface between Link Manager 21 and Storage Section 22, and the Channel I/O Interface between the Channel Interface Controller and the host processing system's I/O channel.

4.2 Operation and Data Flow of Stations

It is the task of each station to allow any required exchange of data and commands between its attached local host processor and all other processors in the system which are attached to other stations. Simultaneous information exchange between one processor and several other processors must be possible, so that for example, processor A can transmit data to processor B and C while it receives commands from processor D.

The modem is the front-end that does the link access and blends out all technological and topological characteristics of the link mechanism. It does all synchronization and timing with respect to transmission on the link, CRC checking of frame contents, and determines whether data must be transferred from the link to the local host processor, and whether data from the local host processor can be dispatched on the link.

In each station, all other stations are treated as subchannels. The local station maintains a table (32 bytes) of status data for each of the other stations or subchannels in the control storage array of the storage section. For each transaction, i.e. receipt or transmission of information to or from another station, the Link Manager consults and updates these tables.

During transfer from processing system to the link or vice versa, data are buffered in the data storage array of the station. Each subchannel, i.e. each remote station, has a dedicated area in the data storage array of a local station.

As not all transactions can be executed simultaneously, pointers for waiting tasks are put into the outbound work queue and CIC work queue, and are removed from these queues sequentially.

The work queues are also the communication means between the Link Manager and the Channel Interface Controller.

For each frame received, the Link Manager uses the origin address to access the control storage array associated with the subchannel. It contains the information which allows the LM to determine:

If the subchannel is primed for the type of information contained in the frame.

If the station which originates the frame is ready for more data.

If the subchannel is in the appropriate operating sequence.

If the data buffers are available for data message handling.

The control byte in a frame indicates if the frame type is a Data Transfer, Regulatory, or Non-Sequenced Frame. When compared with the control array contents the LM can determine:

If the data is to be transferred to the attached host processing system.

If a response is appropriate.

If the data frames transferred have been received in the correct sequence.

With respect to an inbound frame, the primary functions of the Link Manager are to determine the validity of the current frame received, the request embodied in the current frame, the necessity of a response to the request, and proper shoulder tapping to the outbound work queue or the CIC work queue. Upon recognition of an incoming frame destined for the local station, the Link Manager decodes the type of frame and compares the result to the contents in the control array for determination of the type or request to make to the outbound work queue or CIC. It is the responsibility of the Link Manager to set up station information in the station status field of the control array for error condition reporting. The Link Manager checks the contents of the subchannel CR bits against the incoming frame CS bits for send or receive sequence number errors. The final response to a demand frame is made during the next frame cycle to allow time for error detection in the control information or data associated with the most recent frame received.

Initiative to transmit an outbound frame comes from the outbound work queue. When there is work in the queue, the LM accesses the queue at a predetermined time to obtain the necessary information. The times that the LM accesses the work queue are fixed, based on the byte time of each byte to be transmitted to the modem.

Information is placed into the queue by both the LM and CIC, and is accessed in First In First Out FIFO order. There is a maximum of 16 queue entries, with each entry containing 4 bytes of information.

With respect to an outbound frame the primary function of the Link Manager is to transfer the frame in proper sequence and report any error conditions resulting from the frame transfer.

An outbound frame transfer is initiated by the Link Manager. Whenever there is work in the outbound queue and the Link Manager is in a position to transfer a frame, it issues a Request Frame Transfer (Local Transmit Request) to the modem. When the modem is ready to begin accepting the frame, it issues a Start Outbound Frame. Once the frame transfer starts, the Link Manager out-gates each byte of the frame at the Outbound Data Bus rate. When the last byte of information is gated out, the Link Manager issues a Last Outbound Byte Signal, indicating that the last byte for this frame transfer is on the Outbound Data Bus.

In order to prepare to transmit an outbound frame, the Link Manager obtains the necessary control information from the outbound work queue. This byte contains all the necessary information to control the outbound frame transfer. The destination address byte and the control field byte are also contained in the outbound work queue.

The Channel Interface Controller CIC formats three particular frame requests for the outbound work queue. A control frame request is formatted and placed into the queue whenever a read/write command is to be transmitted, as a result of fetching a new DCB. A non-sequenced frame request is formatted and placed into the queue whenever a non-sequenced frame is to be transmitted. A response frame request is formatted and placed into the queue whenever a response is to be transmitted, in order to clear a hold condition.

The Link Manager LM formats and places all types of frame requests into the queue, except those specific frames mentioned above. The LM formats and places into the queue all frame requests which result from a time out.

When a data frame is to be transmitted, there is a certain amount of interlocking between the LM and CIC, before the request is placed into the outbound work queue. This interlocking insures that a data frame is not transmitted before data is placed into the data buffer. Whenever the LM determined that a data frame should be formatted, it formats bytes 0, 1, and 2 of the outbound work queue, and also formats a fetch data request to the CIC. These 4 bytes of information are placed into the CIC work queue. When the CIC fetches the data and places it into the appropriate data buffer, the three bytes of information required by the outbound work queue are then transferred from the CIC work queue into the outbound work queue.

The Link Manager maintains a 20 byte counter in order to synchronize the frame transfer between the Link Manager and the modem, and to control its internal sequencing. In order to insure that each byte is transferred at the proper time, this counter is synchronized, once every frame time, with the modem. At a specified byte time, the modem sends a signal to the Link Manager, which is compared with the sequence counter. If there is a mismatch, the Link Manager takes appropriate action to insure that erroneous data is not sent out on the link or to the host processor.

In the event the modem loses sync, it sends a signal to the Link Manager, indicating that this condition exists. The Link Manager will continue to step the sequence counter, until a specified value is reached. At this time the counter is stopped until the Link Manager and modem can re-establish sync, before a re-start.

A frame retry mechanism is implemented in the Link Manager. A frame may be retried three times before the subchannel DCB is terminated with an error status. The components of the retry mechanism are a time-out stack, capable of simultaneously keeping track of time-outs for the 16 subchannels, and a retry count, located in the control storage array.

Whenever a Data Transfer type frame is transmitted, the time-out for that subchannel is started. When a response is received for that frame the time-out is stopped. However, if no response is received within 64 milliseconds, the time-out is flagged and the Link Manager will initiate a retry. Whenever a retry is initiated, the retry count is incremented by one.

The Link Manager performs three operations on the time-out stack in order to control the starting and stopping of time-outs. When a response frame is received by the Link Manager and there are no other frames outstanding on the link, for a given station, the time-out is stopped. When a response frame is received by the Link Manager and there are more frames outstanding on the link, for a given station, the time-out is restarted in order to account for the frames still outstanding on the link. When a data transfer type frame (DFF, DPF, Status, Control) is transmitted and there is no time-out in progress for a given station the time-out is started by the Link Manager.

5. THE MODEM

5.1 Survey of Modem

Modem 20 is provided for masking out the physical network characteristics and to synchronize the information transfer on the loop. Its functions include interfacing with the physical loop network, interfacing with the Link Manager, delimiting of frames, and initialization and error checking of all frames.

The Modem examines each frame for disposition in one of the following ways:
  (a) The frame is forwarded unaltered for reception by another modem.
  (b) The frame is received and interpreted.
  (c) The frame is replaced by another frame intended for another modem.

Figure 5:
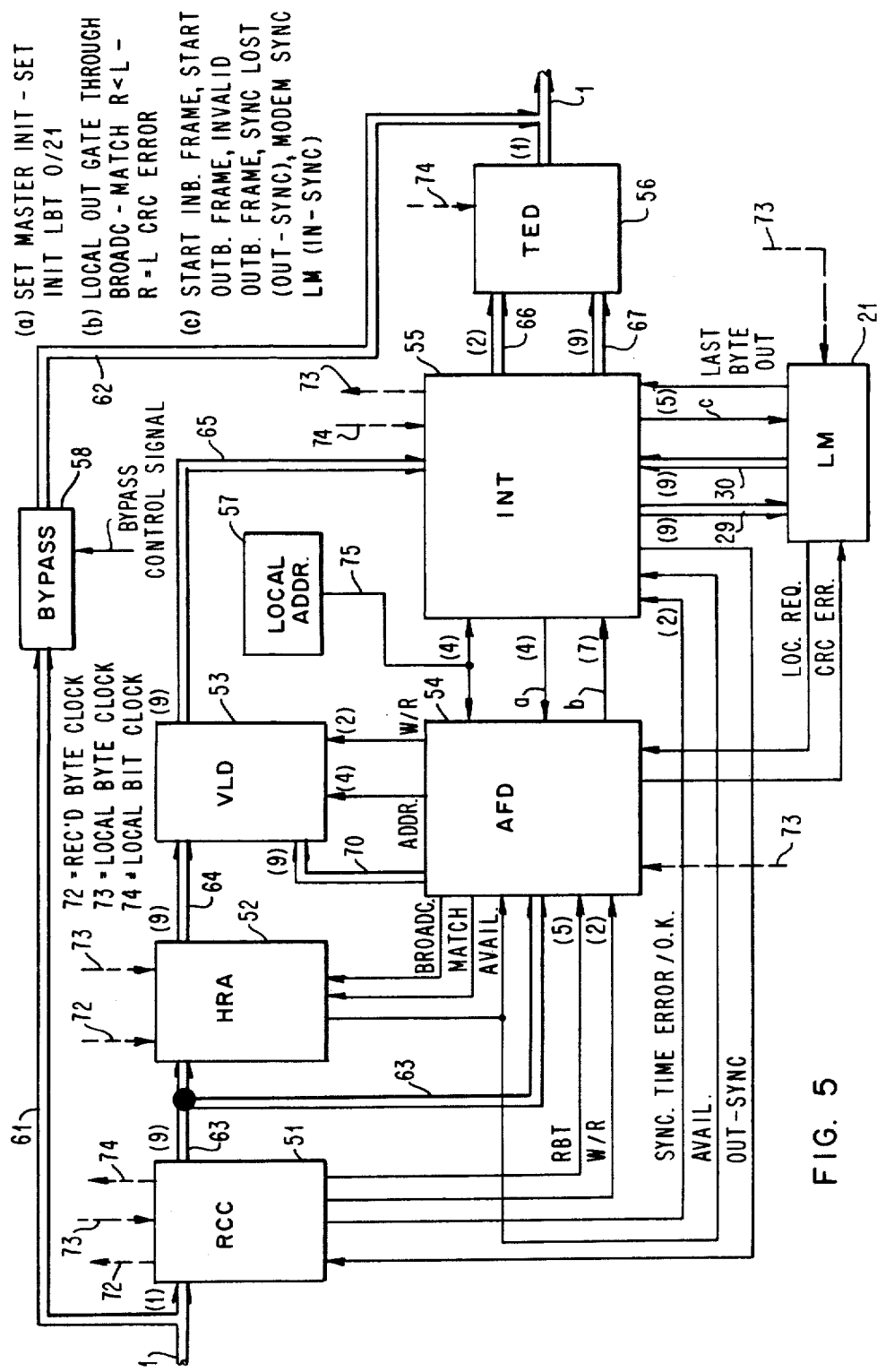
FIG. 5 Block diagram of the modem in a station.

FIG. 5 is a functional block diagram of Modem 20 showing the flow of data and control signals. Link Manager 21 is also shown in FIG. 5 for illustrating its interconnection with Modem 20 over the Modem Interface. Modem 20 comprises the following functional blocks:
  Receiver, Clock and Control Circuitry RCC 51,
  Hold Register Array HRA 52,
  Variable Length Delay Storage VLD 53,
  Addressing and Frame Disposition Circuitry AFD 54,
  Inbound/Outbound Interface Circuitry INT 55, and
  Transmitting Encoder and Driver Circuitry TED 56.
  A Local Address Selector Switch 57 is provided for manually setting each station's address.
  A bypass circuit 58 is also provided.

Interconnections are represented as follows: Main data paths by double lines, control paths by single lines, and clock or timing paths by dashed lines. The actual number of parallel bit lines in each of these connections is indicated by a digit in parenthesis, if it is more than one.

The bit-serial link or loop 1 is connected at the modem input to RCC 51 and at the modem output to TED 56. Single-bit bypass lines 61 and 62 together with Bypass Circuit 58 constitute a bridge between input and output of the modem.

The modem internal main data path is nine bits wide and includes section 63 connecting RCC 51 and HRA 52, section 64 connecting HRA and VLD 53, and section 65 connecting VLD 53 and INT 55. Between INT 55 and TDE 56, there are provided a 2-bit wide path 66 for serialized data, and a 9-bit wide path 67 for sync character information. INT 55 and Link Manager 21 are interconnected by the two directional 9-bit wide data paths 29 and 30. Between VLD 53 and AFD 54, there is provided 9-bit wide path 70 for sync byte data updating. AFD 54 is also connected to RCC 51 by a branch of data path 63.

Three clock lines are provided for carrying clock signals between sections: line 72 for a Received Byte Clock from RCC 51 to HRA 52, line 73 for a Local Byte Clock from INT 55 to RCC 51, HRA 52, AFD 54, and Link Manager 21, and line 74 for a Local Bit Clock from RCC 51 to INT 55 and TED 56.

A 4-bit data path 75 is provided between Local Address Selector 57, and AFD 54 and INT 55.

All control lines between the different functional sections of FIG. 5 are identified by abbreviations for the signals they carry, and are not given individual reference numbers in FIG. 5.

The main functions of the functional sections of modem 20 as shown in FIG. 5 are listed below as a survey:

Receiver, Control and Clock Circuitry 51 RCC

Detect sync characters
Derive received clock, and provide received byte count and received byte timing signals
Generate local clock, and adapt its rate to received clock
Recognize and deserialize incoming data bytes
Check correct mod. 21 arrival of sync characters
Provide READ and WRITE half cycle signals Hold Register Array 52 HRA Store two consecutive received bytes
Adapt byte stream between received clock rate and local clock rate
Gate received data to VLD
Convert sync character contents to sync byte data for input to VLD Variable Length Delay Storage 53 VFD Store a window of the data stream comprising several bytes to obtain a required delay
(Minimum delay = 3 byte periods)

Addressing and Frame Disposition Circuitry 54 AFD

Derive delay pointer (for variable length delay)
Generate addresses for VLD to achieve required delay, and store delay pointer
Update sync character as determined by sync update signal
Compare incoming bytes to local address, to obtain signals for R=L, R<L, OA=L, DA=L
Decode incoming destination address DA to detect broadcast frame
Accumulate CRC for incoming frames and indicate any CRC error for unavailable frames
Determine disposition of incoming frames, to generate control signals for:
 updating available/unavailable indication
 gating through received frames
 gating inbound data to Link Manager
 gating outbound data from Link Manager to transmit section
Pass on READ/WRITE signals from RCC to VLD Inbound/Outbound Interface Circuitry 55 INT Provide local byte count and local byte timing signals from local clock signal
Gate data from VLD to transmit section or to Link Manager
Assemble outbound data stream (frames) from several sources
Insert local address, and generate and insert CRC character during initialization and for local outbound frames
Check validity of local outbound frames
Convert sync byte from VLD into sync character data
Serialize all outgoing bytes
Provide sync/resync procedure and a flywheel check procedure
Store status "in-sync" or "out-of-sync"
Detect temporary master status
Store status "initialization", "temporary master", "temporary slave" during loop initialization Transmitting Encoder and Driving Circuitry 56 TED Generate encoded signal from serialized data, including sync character with code violation from sync character data.

Modem Interface Lines

The Modem Interface between Modem 20 and Link Manager 21 is characterized by transfer lines for following signals:
(a) Modem to LM:
Inbound Data (9 parallel bits)
Local Byte Clock
CRC Error (Invalid Inbound Frame)
Start Inbound Frame
Start Outbound Frame
Invalid Outbound Frame
Sync Lost (Link Invalid Sync)
Modem Sync LM
(b) LM to Modem:
Outbound Data (9 parallel bits)
Local Transmit Request
Last Outbound Byte 5.2 Basic Operation of the Modem and Data Flow The modem's operating procedure for receiving and transmitting data will now be described in connection with FIG. 5. Data are transmitted on the loop in serial form as shown in FIG. 3A. Receiver, Control and Clocking Circuitry RCC 51 detects waveform conditions and signal changes on the link and decodes the sequence of states into a sequence of 0 and 1 bits. These are accumulated in a Deserializer of RCC to obtain parallel bytes.

A complete byte will be shifted from the Deserializer Register of RCC 51 to a first Hold Register HR1 of Hold Register Array HRA 55, and subsequently to a second Hold Register HR2 of HRA. Using received clock for HR1 and local clock for HR2, this allows to adapt the data stream from one clock to the other.

From HR2, each byte is transferred to the Variable Length Delay Storage VLD 53 which is a buffer store for keeping data bytes for a selected time interval to achieve a desired delay. A read and a write control signal are furnished to VLD 53 at appropriate times. The number of bytes which are simultaneously kept in VLD 53 depends on the selected delay.

Addresses for accessing (writing or reading) VLD 53 are furnished by Addressing and Frame Disposition Circuitry AFD 54. The generation of these addresses, the delay selection, and the frame disposition mechanism are functions of AFD 54.

Data bytes read out of VLD 53 after the appropriate delay are sequentially placed on bus 65.

If the data, i.e. logical frame parameters Destination Address, Origin Address, Control Byte, and Information Field received in a frame are to be transferred to the respective station, (i.e., if destination address matches local address, or if it is a broadcast frame) Inbound/Outbound Interface Circuitry INT 55 will be conditioned to gate them from bus 65 to bus 29 for transfer to the station's Link Manager LM 21.

If no outbound data are to be transferred from the station to the link, bytes on bus 65 will be converted to 2-bit groups by INT 55, gated on transmit data lines 66 to Transmitting Encoder and Driver TED 56 and then applied to the link bit-sequentially in the form of an encoded signal as shown in FIG. 3A.

Such reserialization of received bytes and transfer to the link is effected in two situations:

(a) When the received frame is to be passed on to the next station without change (frame unavailable, Destination Address not matching), (b) When data (logical parameters) in the received frame where stripped off and transferred to the respective station (Destination Address matching). In this case, however, the frame is changed from unavailable to available by appropriate marking in the Sync Character, as will be explained in a later section.

If outbound data are ready for transmission in the station's Link Manager, and if the frame was either marked available or was addressed to the respective station, Inbound/Outbound Interface Circuitry 55 will be conditioned to accept these data on bus 30, convert them to a sequence of bit pairs and gate them to transmit data lines 66 for transfer to TED 56 from where it is transmitted on the link. In this case, data bytes on bus 65 will not be used and are thus destroyed. CRC character information and also the local station address (i.e. the origin address) will be furnished by INT 55.

Sync Character Handling

The sync character received as head of each frame is handled different from the other characters, because it comprises the code violation. The sync byte stored in VLD 53 is different from the received sync character.

The code violation which is an unnormal state sequence extending over four bit periods as shown in FIGS. 3B and 3C is recognized by the circuitry in RCC 51. This results in a respective signal on one of lines 63 to HRA 52. This indication is passed on through HRA 52 over lines 64 to VLD 53. The actual sync byte stored in VLD 53 in response to the received sync character has the following format:

| Bit No. | 0 | 1 | 2 | 3 | 4 | 5 | 6 | 7 | P |
|---|---|---|---|---|---|---|---|---|---|
| Function | X | X | X | B | PDA | POA | M | A | S |

Function designations have the following meaning:
X = Not used (reserve)
B = Broadcast frame (Received Destination Address is broadcast address)
PDA = Destination Address Parity (as received)
POA = Origin Address Parity (as received)
M = Match (Local Address matches with Destination Address)
A = Frame Available (Availability Bit as received)
S = Sync Byte Indicator (occupies parity bit position)

The Broadcast and Match indicators B and M are derived in AFD 54 as will be explained later. The final coded sync byte is then furnished on lines 64 for storage in VLD 53. It may be updated by information presented on lines 70 from AFD 54.

The sync byte is not transferred from VLD 53 to the station. However, for frames to be passed on from VLD 53 to TED 56, the sync byte is read out over bus 65 to INT 55 which transfers the respective information (Availability, DA parity, OA parity) over lines 67 to TED 56. The latter generates from this information the sync character to be transmitted over the link, including code violations, as shown in FIGS. 3B and 3C. For frames carrying outbound data from the respective station, sync character information is transferred to AFD 54 and then used to update the sync byte via lines 70 in VLD 53. (Non-available/available indication, DA and OA parities). It is later transferred to TED 56 which then generates the sync character signal.

Cyclic Redundancy Check CRC

A cyclic redundancy check is made for each received frame in AFD 54. Over 19 bytes of each frame, i.e. the logical frame parameters (DA, OA, C, INFO), AFD 54 accumulates CRC data in respective circuitry. When the 20th byte (CRC character) is received, it is combined with the CRC data of the frame. A check is then made—if the frame was unavailable—whether a specific bit pattern is present. If this is not true, an error indication is transferred to Link Manager 21.

For outbound data from the station, INT 55 accumulates a CRC character over the 19 logical frame parameter bytes. It then adds the accumulated CRC character as 20th byte of the frame to the data stream transferred to TED 56.

(Modulo 21) Count and Byte Timing

As was mentioned already, there exist two clocks in each modem: a Received Clock and a Local Clock. The basic clocks are generated in RCC 51 from the received data and from a local oscillator, and the clock rates are adapted to each other by occasional skipping of pulses in one of the clocks.

Two byte timing and modulo 21 counting units are provided in the modem: one in RCC 51 for the Received Clock, and one in INT 55 for the Local Clock. Their patterns are the same but they have a phase shift which corresponds to the delay in VLD 53 plus a two-byte delay in HRA 52. Their relative phase is adjusted during the synchronization procedure.

The Received Byte Time Signals of RCC 51 control operations in RCC 51, AFD 54 and in half of HRA 52, namely Hold Register O. The Local Byte Time Signals control operations in INT 55, VLD 53 and other half of HRA 52, namely Hold Register 1. The delay is preselected during initialization and stored as Delay Pointer in AFD 54.

A check is made in RCC 51 whether sync characters arrive correctly at mod. 21 intervals, to cause resynchronization if necessary.

6. THE STORAGE SECTION

6.1 Storage Units and Subchannel Concept

As was mentioned above already, Storage Section 22 comprises Control Storage Array (CSA) 25, Data Storage Array (DSA) 26 and Work Queue Storage WQS 27. A few details will be given for each of these units in the next section.

It was also mentioned already that in each station, the other stations of the system are treated as subchannels. Both CSA 25 and DSA 26 have a dedicated area or subsection for each subchannel, i.e. for each of the other, remote stations. Therefore, control information and data in transfer can be kept separate by subchannel, thus allowing simultaneous connections to exist, and enabling interleaved communication transactions with several partner stations.

It is assumed for the present embodiment that 16 subchannels are provided in each station.

CSA 25 as well as DSA 26 can be accessed by both, the Link Manager and Channel Interface Controller, and both can generate addresses and read and write control signals for the storage arrays.

6.2 Structure and Contents of Control Storage Array CSA

Control Storage Array CSA 25 comprises one subsection for each subchannel (thus there are 16 subsections). Each subsection includes 16 words WD of 16 bits each. The following table shows what kind of control and status information is held in the CSA for each subchannel.

WD 00/01—Station State Field SSF
WD 02—Link Transfer Count LTC
WD 03—Data Retry Address RA
WD 04—Local Station Status (1 Byte) & Origin Station Status (1 Byte)
WD 05—Interrupt Level and Mask (1 Byte)
WD 06—Interrupt Information Byte & Interrupt Condition Code (1 Byte)
WD 07—Reserved
WD 08—Various Indicators
WD 09—Device Parameter 1: Destination Address and Control Byte
WD 10—Device Parameter 2: Inbound DPF Count
WD 11—Device Parameter 3: DCB Identification for progr.-contr. interrupt
WD 12—Device Parameter 4: Status Address
WD 13—Device Parameter 5: Chain Address
WD 14—Word Count in Message
WD 15—Main Store Address of Message The Station State Field SSF (WD 00/01) contains in concise form the information mainly required by Link Manager and CIC and is accessed by the LM for each transaction. Its contents is explained in somewhat more detail in the next section. The Link Transfer Count LTC (WD 02) indicates for a sequence of data transfers concerning a single block of information how many bytes were transferred already. The Data Retry Address RA (WD 03) points to the storage location from where transfer must be restarted if an error occurred during transmission. For data up to that location, acknowledgement was received. The fifth word (WD 04) contains additional status information on the local station and the subchannel's remote station. The next three words (WD 05 ... WD 07) are provided for information that is required in connection with interrupts.

The second half of each subchannel subsection in CSA, i.e. WD 08 ... WD 15, comprise the Device Control Block DCB. This is generated by software in the host processor, loaded at command time, and is activated and updated for each frame transfer or fetch.

6.3 Details of Station State Field SSF

The 32 bits of each Station State Field are used as follows:

Word 00:

Bits 0/1 = Station State: Specifies whether the station has been activated by the attached processor, and if so whether it has been activated for a read or write operation.

Bit 2 = Retry: Used by the Link Manager to indicate to the CIC that one or more frames in the last data exchange were retried.

Bits ¾ = Channel Interface State: Provides a running account of the subchannel interface states when operating on the processor I/O interface (available/command transfer/data transfer/completion transfer).

Bits 5/6 = Buffer Control: Identifies the status of the data buffers. On read operations the buffers are loaded by the LM, on write operations by the CIC. Data for non-sequenced frames are always loaded into buffer 0 locations. The four states are: Empty/buffer 0 full/buffer 1 full/both full.

Bit 7 = Hold/Retry: Identifies the receipt of a hold frame or a retry condition. Reset only on receiving a response frame with proper CS and CR bits.

Bit 8 = Non-Sequenced Frame Received.

Bits 9/10/11 = Station Link Status: Identifies current operational status of the link. It is used heavily by the Link Manager to ensure proper protocol on the link (Important for distinguishing the three states in each data exchange, i.e. initiation, transfer sequence, and termination).

Bits 12/13 = Send Sequence Count CS.

Bits 14/15 = Receive Sequence Count CR.

Word 01:

The second word of SSF mainly contains three bits for a time-out retry count TOR. This is used to keep track of the number of time-outs that have occurred in the subchannel for the denied frames sent. The maximum time-out retry count allowed is three.

The remaining bits are in reverse and can be used for special purposes.

6.4 Structure and Contents of Data Storage Array DSA

Data Storage Array DSA 26 comprises (like the Control Storage Array) one subsection for each of the 16 subchannels. Each subsection includes two buffers, each holding 16 bytes of data (i.e. totally 32 bytes for each subchannel).

The two buffers of each subsection can be used in an alternating fashion: While the Link Manager may write the 16 data bytes taken from the information field of one frame into one of the buffers, the Channel Interface Controller can read from the other buffer 16 previously loaded bytes and transfer them via the I/O Channel Interface to the processor.

Alternating use of the two buffers is of course also possible in the opposite direction for transfer from processor to the link. Simultaneous transfer in both directions will never occur.

6.5 Work Queues WQ's

Work Queue Storage 27 is partitioned into two sections: A CIC Work Queue Store and an Outbound Work Queue Store. Both work queue stores are used in a FIFO manner.

Tasks for the Channel Interface Controller are entered into CIC WQ by the Link Manager and extracted sequentially by the CIC. Tasks for the Link Manager and necessary information are entered into the Outbound WQ by the CIC and the LM, and are extracted by the LM sequentially.

Total capacity of WQ storage is 64 positions each including four 8-bit words. Of the 64 positions, 48 belong to the CIC WQ and the remaining 16 belong to the Outbound WQ.

Access to each queue is controlled by a pair of 8-bit address counters, indicating the next position to be written or read, respectively. Each counter is subdivided into a 6-bit and a 2-bit section, which define the queue position and the word within the queue position. A compare circuit checks for an equal condition between the 6-bit sections of the counters. If the counters are equal and the last request to the queue was a write operation, the queue is full. If the counters are equal and the last operation was a read, the queue is empty. If the counters are not equal, one or more work requests are pending in the queue. If 2 or more words are required from a queue position, the 2-bit counters are incremented to form the complete address for the desired word or words. When the operation on the queue is finished, the 2-bit counter is reset to zero and the 6-bit counter is incremented. In this manner, the compare circuit will not indicate a change in the queue status until the entire operation is completed. The 6-bit counter for the CIC Work Queue is modified so that it cycles through 48 distinct states by altering the sequence of the positions of the counter. The corresponding positions in the Outbound Work Queue 6-bit counter are forced to the state not occupied by the CIC counter. In this manner, the counters form two circular FIFO structures containing 48 or 16 positions respectively.

Channel Interface Controller CIC Work Queue Entries:

Each four-byte entry in any of the 48 positions of the CIC WQ comprises the following information:
Byte 0:
  4 bit Subchannel identification SCID
  4 bit CIC command
Byte 1:
  4 bit Subchannel identification SCID
  1 bit Buffer 0/1 indicator BFR
  2 bit Information field length indicator CNTL (0 byte/1 byte/16 bytes)
  1 bit Time-out control bit STO (for response-requiring frames)
Byte 2:
  8 bit Destination address DA
Byte 3:
  8 bit Control byte C Channel Interface Controller CIC commands:

The four bits for CIC command allow to distinguish the following 15 different commands for the Channel Interface Controller:
  Store Data Transfer (Buffer 0 or Buffer 1)
  Fetch Data Transfer (Buffer 0 or Buffer 1)
  Store Partial Frame (Buffer 0 or Buffer 1)
  Retry Partial Frame (Buffer 0 or Buffer 1)
  Issue Status of Subchannel
  CIC Interrupt Processor
  Detected Error on Data Outbound
  SIF Received (Set Initialization)
  Initialization Data Frame IDF (Buffer 0 or Buffer 1)
  ITF Received (Initialization Termination)

Outbound Work Queue Entries:

Each four-byte entry in any of the 16 positions of the Outbound WQ comprises the following information:
Byte 0:
  4 bit Subchannel identification SCID
  1 bit Buffer 0/1 indicator BFR
  2 bit Information field length indicator CNTL (0 byte/1 byte/16 bytes)
  1 bit Time-out control bit STO (for response-requiring frames)
Byte 1:
  8 bit Destination address DA
Byte 2:
  8 bit Control byte C
Byte 3:
  8 bit Status byte (information for status frames)

7. THE CHANNEL INTERFACE CONTROLLER CIC

The function of the Channel Interface Controller CIC is to provide an interface between the station and the host processor, via the I/O channel, for up to 16 subchannels contained within the station.

The CIC consists of three separate, but logically connected areas. The three areas are Poll and Interrupt Control, I/O Sequencing and Address Decode, and Data Transfer and Cycle Steal Control.

The I/O Sequencing and Address Decode area provides interface synchronization for I/O operations and information transfer between the station and the host processor. This area decodes commands and addresses from the host processor and initiates the correct sequence of operations to the appropriate subchannel.

The Poll and Interrupt area provides the control and interface sequencing for the requesting of cycle steal and interrupt from the host processor, and the capture or bypass decoding of the host processor response.

The Data Transfer and Cycle Steal area provides the remaining functions of the CIC. These functions consist of logic for controlling physical storage space for 16 subchannel subsections in the Control Storage Array and 32 data buffers (two per subchannel) in the Data Storage Array along with the alternate usage control of the data buffers. It also provides the multiplexing, byte count, storage addressing, cycle steal and interrupt initiation, and CIC to Link Manager interface for the 16 subchannels contained within the station.

8. THE LINK MANAGER LM

8.1 Main Functions

Main purpose of the Link Manager LM is to provide link protocol functions and logical frame management. These and other functions were already briefly described in section 4 above.

The Link Manager LM analyzes control bytes of received frames, places the data into DSA buffers and maintains current status information for each subchannel in the CSA. It formulates control bytes for outgoing data transfer frames and extracts for these frames the data from DSA buffers. It was mentioned above already that the Link Manager LM enters tasks for the Channel Interface Controller, as demanded by frames received on the link, into the CIC Work Queue, and gets its own tasks from an Outbound Work Queue.

All of the Link Manager functions are provided in hardware, to enable fast operation that is necessary for a unit that serves 16 subchannels in multiplex.

Some of the Link Manager's functions are important for intersystem initialization and thus for the present invention which is concerned with remote initial program loading. Therefore, the Link Manager and its frame handling operation are described in somewhat more detail in the following sections.

8.2 Functional Units and Data Flow

Figure 6A:
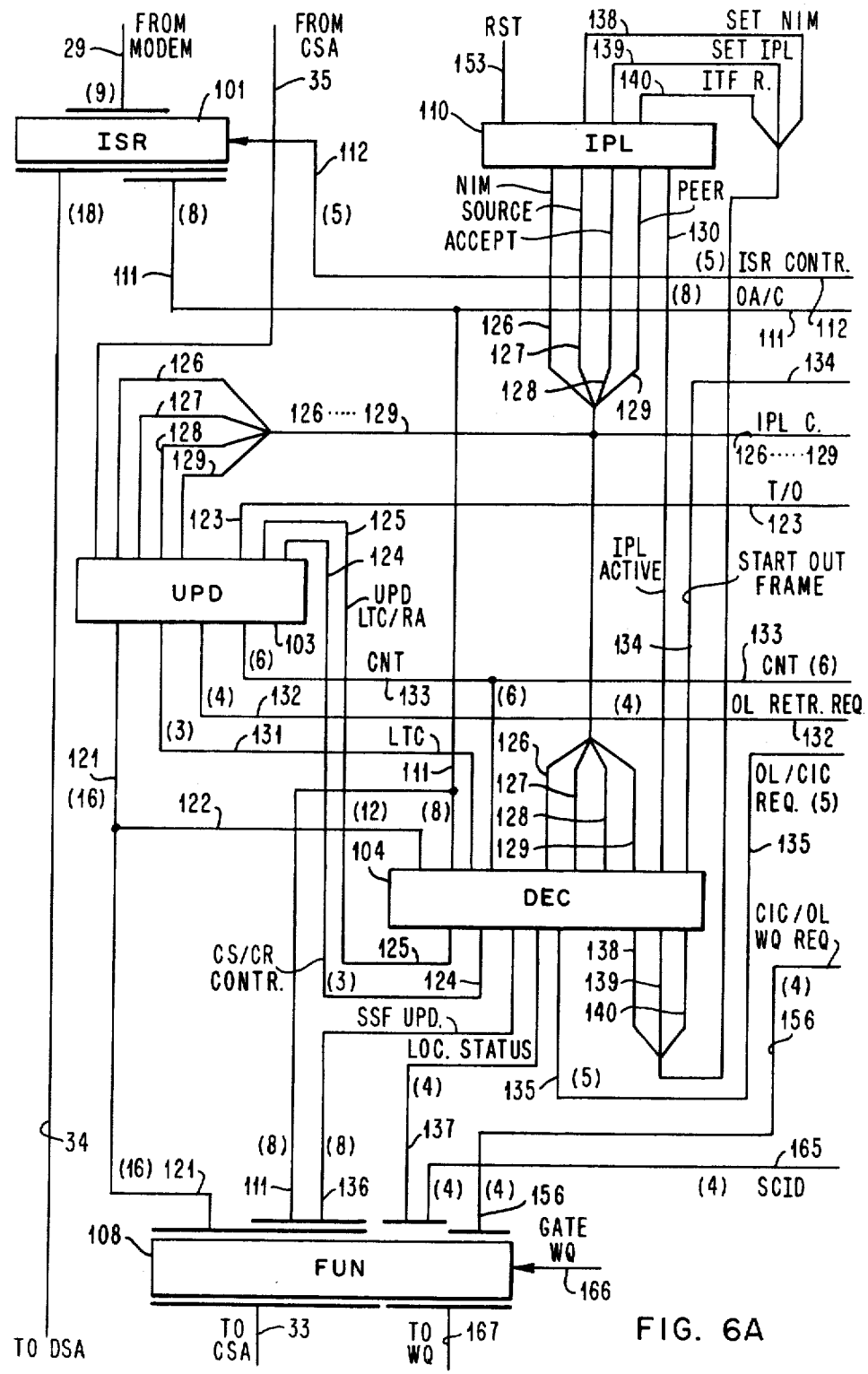

The main functional units of the Link Manager, their interconnections and the data flow will now be described in connection with FIGS. 6A and 6B. The functional units shown are
  Input Staging Register ISR 101,
  Output Staging Register OSR 102,
  Updating Unit UPD 103,
  Decoder and Status Monitor DEC 104,
  Sequence Controller SCT 105,
  Work Queue Response and Encoder Unit ENC 106,
  Address Register and Funnel ADR 107, Funnelling and Latching Unit FUN 108,
Time-Out Stack TOS 109, and
Remote IPL Control Unit IPL 110.

Input Staging Register ISR 101/Output Staging Register OSR 102

All data incoming from and outgoing to the Modem are passed through the two register units ISR 101 and OSR 102. Both comprise two 8-bit (plus parity) register sections, i.e. each can hold two data bytes.

Input to ISR 101 is the 9-bit data bus 29 from the Modem. It can be gated to either of the two byte sections. One output is the 18-bit data bus 34 to the Data Storage Array DSA 26. Another output is an 8-bit bus 111 connected to DEC 104 and to FUN 108 for transferring a control byte and to ADR 107 for transferring an origin address. Five control lines 112 for input/output gating selections are connected to ENC 106.

One input to OSR 102 is the 18-bit output bus 36 from Data Storage Array DSA 26. Another input is the 8-bit output bus 38 from Work Queue Store 27 for transferring the destination address and the control byte from a WQ entry into an outbound frame. Output from OSR 102 is the 9-bit data bus 30 to the Modem, which can be selectively connected to either of the two register sections. Five control lines 113 for input/output gating selections are connected to ENC 106.

Updating Unit UPD 103

Updating Unit UPD 103 provides following functions:

Buffering Station State Field SSF from Control Storage Array CSA

Adjusting sequence counts CS and CR after receipt or transmission of each sequenced frame Increasing retry address RA for the Data Storage Array in accordance with progress of successful transmissions (sequence count checking)

Decoding and updating link transfer count LTC which reflects the number of bytes that were already transmitted during the respective data transfer sequence Counting modulo 20 (for correct frame/byte sequencing)

Most important tasks of UPD 103 are:

(1) Buffering the Station State Field fetched from the Control Storage Array for the respective subchannel involved in a current transaction, furnishing selected information thereof to Decoder 104 for status checking and control operations, updating the SSF to reflect the executed transaction (e.g. increasing sequence counts), and retransferring the updated SSF to CSA.

(2) Maintaining a modulo 20 count in synchronism with the frame transactions, and furnishing the current value to other functional units of the Link Manager.

Main input to UPD 103 is the 18-bit bus 35 from Control Storage Array CSA 25. Main output is a 16-bit bus 121 connected to the input of FUN 108 (which leads back to CSA 25). A 12-bit branch 122 of bus 121 is connected to the input of DEC 104. Other inputs to UPD 103 are: a retry request line 123 from TOS 109 (1 bit), CS/CR control code lines 124 from DEC 104 (3 bit), update LTC/RA control line 125 from DEC 104 (1 bit), and four local station mode lines 126, 127, 128 and 129 from IPL 110 for indicating whether the station is in NIM mode, whether it is an IPL Source station, whether it is an IPL Acceptor station, and whether it is an IPL Peer station (IPL states to be explained later). Other outputs from UPD 103 are: LTC code lines 131 to DEC 104 (3 bit), outbound link retry request lines 132 (4 bit) to ENC 106, and six lines 133 for the current mod. 20 count value, leading to units DEC 104, SCT 105, and ENC 106.

Decoder and Status Monitor DEC 104

Decoder and Status Monitor DEC 104 provides following functions:

Decoding of control byte of inbound frames

Decoding of parts of the SSF available in UPD 103

Monitoring compatibility between current subchannel status (and local station status) and the action required by incoming frame.

Thus, this unit develops the control signals for the next operations as dictated by the C byte of the frame just received through the modem and by the current status, and it generates control signals to avoid any transaction and status changes if the intended actions do not fit the presently existing status (e.g. arrival of data from remote station when local station was just prepared to transmit data to the respective remote station). It further provides updating signals for the Station State Field in CSA.

Main inputs to DEC 104 are 12-bit bus 122 from UPD 103 for Selected Subchannel Status data, and the 8-bit output bus 111 from ISR 101 for control bytes. Other inputs are: LTC code lines 131 from UPD 103 (3 bit), local station mode lines 126, 127, 128 and 129 from IPL 110 for indicating NIM mode, IPL Source and IPL Acceptor and IPL Peer Acceptor Status, line 130 indicating "IPL Active" state, six Mod. 20 count lines 133 from UPD 103, and "Start Inbound Frame" control signal line 134 from the Modem.

Output lines from DEC 104 include:

CS/CR control code lines 124 to UPD 103 (3 bit), update LTC/RA line 125 to UPD 103, outbound link/-CIC request lines 135 to ENC 106 (5 bit), and eight plus four main output lines 136 and 137 to the Funneling and Latching Unit 108, of which eight carry information for the Control Storage Array (two buffer status bits, three SLS bits, and a freeze, Q bus, and hold bit), and four carry information for the Work Queue (local status code).

There are further three output lines 138, 139 and 140 for transferring control signals "set NIM mode", "set IPL Active mode", and "ITF received" to Remote IPL Control Unit 110.

Sequence Controller SCT 105

Sequence Controller SCT 105 mainly furnishes address sequences for stepping through storage locations in a particular subchannel's subsections in CSA and DSA during one frame transaction, and the necessary read and write signals.

Its input lines include: Retry request line 123 from Timeout Stack 109, four local station state lines 126, 127, 128 and 129 from IPL 110 indicating NIM mode, and IPL Source/IPL Acceptor/IPL Peer States of the respective station, the six mod. 20 count value lines 133 from UPD 103, four control signal lines from the modem, i.e. line 141 for "Start Outbound Frame", line 142 for a synchronization signal, line 143 for "Invalid Outbound Frame", and line 144 for "Loop Sync Lost", and a System Reset line 153.

Output lines are: eight addressing control lines 145 for Address Register 107 (five for hold control and three for gate control), six CSA access control lines 147 of which four carry the low part of the CSA address (location within subchannel subsection), and two carry the CSA read/write control signals, six DSA access control line 149 of which four carry the low part of the DSA address (location within subchannel subsection) and two carry the DSA read/write control signals, and three sequence control signal lines 151 to ENC 106.

Work Queue Response And Encoder Unit ENC 106

Work Queue Response and Encoder Unit ENC 106 is mainly provided for furnishing Work Queue input and control signals and ISR/OSR control signals in response to coded requests from UPD 103 and DEC 104, in response to some WQ output signals, and in response to control signals from the Modem.

Inputs to ENC 106 are: outbound link/CIC request lines 135 from DEC 104 (5 bit), outbound link retry request lines 132 from UPD 103 (4 bit), sequence control signal lines 151 from SCT 105 (3 bit), a line 152 from the modem for a control signal "CRC Error", a system reset line 153, four lines 154 furnishing WQ output information from Address Register and Funnel (ADR) 107, and the mod. 20 count value lines 133 from UPD 103 (6 bit).

Outputs from ENC 106 are: five ISR control lines 112 and five OSR control lines 113 (these signals control gates in ISR 101 and OSR 102 for selecting the appropriate source and destination during each byte time of a frame cycle), two Work Queue control lines 155 (request WQ OL/CIC), which are part of Work Queue bus 37, and four Work Queue input signal lines 156 (CIC-/OL WQ request) connected to Funnelling and Latching Unit 108, which will transfer these signals to Work Queue Storage 27. There are further provided two output lines for control signals to the modem, which are line 157 for the transmit request signal for an outbound frame, and line 158 for the signal "Last Byte Out" indicating last information byte time of a frame.

Address Register and Funnel ADR 107

Address Register and Funnel ADR 107 provides following functions:
  Storing the origin address OA of an incoming frame, for subchannel selection in CSA and DSA during the inbound frame cycle
  Funnelling the subchannel identification SCID for an outbound frame from the Work Queue entry to addressing circuitry of CSA and DSA for subchannel selection
  Funnelling the SCID to Time-Out Stack 109 for subchannel selection (for outbound frames requiring a response)
  Storing a subchannel identification from TOS 109 when a time-out occurs, for addressing the respective subchannel sections in CSA and DSA, and for furnishing it to the Work Queue, and
  Funnelling 4 bits of the first byte of each WQ entry into ENC 106 for controlling LM operation.

Inputs to ADR 107 are: 8-bit output bus 111 from ISR 101 (for transferring an OA), 8-bit output bus 38 from Work Queue Store 27 (for transferring an SCID), and four subchannel ID lines 161.

Outputs from ADR 107 are: Four WQ output signal lines 154 to ENc 106, four address lines 162 to CSA 25 and four address lines 163 to DSA 26, for transferring the high four bits of CSA/DSA addresses (i.e. the bits selecting the subchannel subsection in CSA and DSA, respectively), four subchannel ID lines 164 to TOS 109, and four subchannel ID lines 165 to FUN 108 (for transfer to the Work Queue input).

Funnelling and Latching Unit FUN 108

Funnelling and Latching Unit FUN 108 provides an output path from several Link Manager Units to the Control Storage Array CSA and to the Work Queue Storage. It latches the received signals so that they are available for transfer to CSA and WQ during a sufficiently long period of time.

Input lines to FUN 108 are: 16-bit bus 121 from UPD 103 (for status data), eight plus four bit lines 136 and 137 from DEC 104 (also for status data), 8-bit bus 111 from ISR 101 (for control bytes of non-sequenced frames which are to be transferred to the CSA), four WQ input signal lines 156 from ENC 106, and four subchannel ID lines 165 from ADR 107 (transferring a subchannel ID from TOS 109 when a time-out occurs). A gating signal line 166 is provided for controlling the gating of WQ destination data to the WQ bus.

Output lines of FUN 108 are: 18-bit bus 33 to Control Storage Array 25, and eight lines 167 (in output bus 37) to Work Queue Storage 27.

Time-Out Stack TOS 109

Time-Out Stack TOS 109 provides 16 simultaneous time-out functions for the 16 possible subchannels. A time-out operation is started by furnishing the respective subchannel ID (SCID) on four input lines 164 from ADR 107, and a start signal on control input line 168. A time-out operation can be cancelled by providing the respective SCID on lines 164 and a stop signal on control input line 169. A predetermined time interval after any time-out start, a time-out signal appears on output line 123 which leads to UPD 103 and to SCT 105 (for starting retry operations), and simultaneously the respective SCID is furnished on four output lines 161 for transfer to ADR 107.

Remote IPL Control Unit IPL 110

Remote IPL Control Unit IPL 110 is provided for indicating whether the respective station is a remote IPL Source or Acceptor, whether it is a Peer IPL Acceptor or a Slave IPL Acceptor, whether it is in non-intelligent mode NIM or normal operating mode NOM, and whether it is just in a status of being remotely loaded IPL data.

IPL 110 mainly contains three jumpers and two latches. Circuit details and operation will be explained in section 10. Meaning of the terms IPL Source and Acceptor, as well as Peer and Slave IPL Acceptor will be clarified in section 9.

Input to IPL 110 are: three IPL control lines 138, 139 and 140 from DEC 104 for signals "set NIM", "set IPL" and "ITF received"; and the system reset line 153.

Output lines from IPL 110 are: A line 126 indicating NIM Status, a line 127 indicating IPL Source Status, a line 128 indicating IPL Acceptor Status, a line 129 indication Peer IPL Acceptor Status (or Slave IPL Acceptor Status if not activated), and a line 130 indicating status "IPL Active", i.e. initial program load in progress. These four control lines are connected to inputs of UPD 103, DEC 104, and SCT 105. For an alternative solution (as will be explained in section 10) line 130 could also be directly connected to the Channel Interface Controller to allow immediate actions in the CIC and the processor when the IPL Active Status begins.

8.3 Flow of Frame Fields for Inbound and Outbound Frames

To simplify understanding of the frame handling operations which are described in the following sections, a survey is given below of the flow of the individual fields of a frame, or more particularly a survey of their destinations (inbound) or origins (outbound).

Frame field designations and functions were given already in section 1.3 but are briefly reviewed here:

S = Sync Character/DA = Destination Address/OA = Origin Address/C = Control Byte/INFO = Information (16 data bytes)/CRC = Frame Check Character.

Inbound Frames

S: Stays in *Modem*. Controls timing, and releases outbound frames (if available).

DA: Used only in *Modem*. Controls gating of frame contents (OA, C, INFO) into station (if address matches).

OA: Transferred to *Link Manager*. Addresses CSA and DSA for subchannel selection.

C: Transferred to *Link Manager* for sequenced frames. Controls LM operation and formulation of work requests for CIC. Part of information entered into CSA. Transferred to *CIC* and *Host Processor* for non-sequenced frames to control special operations.

INFO: Transferred into *Data Storage Array*. From there extracted by CIC for transfer to *Host Processor* storage.

CRC: Stays in *Modem* where check is made. Only result signal transferred to LM.

Outbound Frames

S: Formed in *Modem*.

DA: Extracted from *Work Queue*. Formed by *Link Manager* for data transfer frames, response frames, and time-out frames. Formed by *Channel Interface Controller* for control frames and non-sequenced frames.

OA: Inserted by *Modem* (fixed station address).

C: Extracted from *Work Queue*. Formed by *Link Manager* for data transfer frames, response frames, and time-out frames. Formed by *Channel Interface Controller* for control frames and non-sequenced frames.

INFO: Extracted from *Data Storage Array*. Transferred to DSA from *Host Processor* by CIC.

CRC: Generated in *Modem*.

8.4 Handling of Inbound Frames by the Link Manager

When a frame is received by the modem which is addressed to the respective station, the Link Manager is notified by the signal Start Inbound Frame for starting the necessary operations. Bytes of the frame enter the Link Manager through ISR 101. The Origin Address is transferred to ADR 107 for selecting the subsections in Control Storage Array CSA and Data Storage Array DSA associated with the sender of the received frame. The control byte is transferred into DEC. Data bytes from the INFO field are transferred into a DSA buffer, as addressed by the contents of ADR 107 (subchannel selection) and SCT 105 which sequentially addresses the locations within the buffer.

Control Storage Array CSA is also addressed by the contents of ADR 107 and by SCT 105 to first fetch the Station State Field of the subchannel and store it in UPD 103. Control Field C byte and Station State Field SSF are decoded to develop control and updating signals as required (SSF is partially transferred into DEC 104). Subsequent further bytes are then fetched from CSA as required.

A check is made whether the action required by the control byte fits to the present status, i.e. whether the transaction was correctly initiated by a control frame. Station Send Sequence CS and CR Station Receive Sequence counts are compared, LTC and retry address updated if appropriate, and also CS and CR are updated. If an incorrect condition or error is encountered, updates are reversed and the transaction is stopped. Respective indications are put into the control block.

When the frame requires an action by the CIC (which is e.g. the case for received data), a coded request is transferred to ENC 106 which in its turn formulates a coded entry for the CIC Work Queue (CIC command). The subchannel identification for the CIC WQ entry is transferred from ADR 107. The entries are gated by FUN 108 to the WQ. If a response frame must be returned to the sender, a respective entry for the Outbound Work Queue (Link Manager task) is formulated in a similar manner by ENC 106.

At the end of the frame, the updated CSA information (i.e. SSF) is returned to the Channel Storage Array.

Further handling of the received data, i.e. transfer into processor storage, is done by the CIC when it accesses the corresponding Work Queue entry after it has reached the top of the queue. Channel Interface Controller CIC than can also access the CSA information for the respective subchannel, which information will then direct further actions, and which may be also updated to reflect the operations completed by CIC.

8.5 Handling of Outbound Frames by the Link Manager

For frames that are to be transmitted from the station over the link, an entry has to be entered into the Outbound Work Queue from where Link Manager sequentially gets its tasks. For certain types of frames, the Link Manager formulates the Work Queue entries by itself (e.g. consecutive data transfer frames after an initial control frame). For other types of frames, the entries—including control byte and destination address—are formulated by the CIC and placed into the Outbound Work Queue.

For data transfer frames, the necessary data will be prefetched from the processor and entered into the DSA buffer in cooperation between CIC and LM.

The Link Manager notifies the Modem if it needs a frame for transmission, by the Transfer Request signal. When a frame becomes available, the Modem activates the Start Outbound frame signal.

The Link Manager, stepped by SCT 105, then first transfers the first byte of the Work Queue entry into ADR 107. The SCID is then available in ADR 107 for accessing the CSA and DSA, with sequential location addresses generated by SCT 105. The SSF is again examined and updated, as well as other status data. If the STO bit is on in the WQ entry, the SCID is sent to TSO 109 and a time-out started for the respective subchannel.

All bytes which must be transferred to the Modem must pass through OSR 102. Gates are opened to first release the destination address and the control byte which are available in the Work Queue, to the Outbound Staging Register (OSR). Thereafter, the output bus of DSA is gated to OSR. The DSA buffer is also addressed by the SCID in ADR 107 and by further address bits (which select sequential locations in DSA) from SCT 105. Thus, all bytes are gated from the buffer into an INFO field of a frame, and returning the updated control data to CSA ends execution of the respective task in the Link Manager.

8.6 Handling of Non-Sequenced Frames

For non-sequenced frames, actions are similar, with the distinction however that no CS and CR counts are sent, checked or updated, and the control byte and origin address are stored completely in the CSA for inbound frames so that they can be transferred to the processor, and for outgoing frames control byte and destination address are generated in the processor and placed into CSA for subsequent transfer into the Outbound Work Queue. Some types of non-sequenced frames can convey data, which are also buffered in DSA during transfer as for normal data transfer frames.

9. INTERSYSTEM INITIALIZATION PROCEDURE

9.1 Initial Program Load IPL Possibilities and Conditions

The present processor intercommunication system provides for the remote loading of initial program data from one processor into another processor. According to the invention, the peer stations which are basically equal to each other can be assigned three different states: IPL Source Station, Peer IPL Acceptor Station, and Slave IPL Acceptor Station. These states are manually set by installing jumpers in the station hardware, and can be changed only manually (not remotely and during normal operation).

An IPL Source Station has IPL data available for other, remote processors. It must be loaded itself locally by an operator. Usually, there is only one IPL Source Station in the system. There may be a plurality of IPL Source Stations, but in this case each will have IPL data for an assigned subset of remote IPL Acceptor Stations, i.e. for each station that can be remotely loaded, there is only one assigned IPL Source in the system that has the appropriate IPL data.

An IPL Acceptor Station is a station that can be remotely loaded from an IPL Source Station. There are two types of IPL Acceptor Stations: A Peer IPL Acceptor will accept a remote IPL only if it has requested it, or if it decides to accept an IPL offered (without request) by an IPL Source. A Slave IPL Acceptor must accept any IPL offered to it by an IPL Source, whether it was requested or not. Thus, when in NOM mode, i.e. after the first loading of initialization program data, a Slave IPL Acceptor can be interrupted at any time for changing its personality by loading new IPL data, whereas a Peer IPL Acceptor, when it is offered a personality change, can finish its current tasks and operations and can decide to assume the initialization status for accepting IPL data at a convenient point in time when no data or results will be lost and no attached device will be unduly interrupted or disturbed by complete interruption of the processor.

9.2 Initial Program Load IPL Frame Types and Exchange Sequence

According to the invention, four different frame types are provided for the IPL procedures: RIF, SIF, IDF, and ITF. They are exchanged sequentially for an IPL operation between an IPL Acceptor and an IPL Source, as illustrated in FIG. 7. The station requesting the initialization structures the request frame RIF via station hardware, while the station providing the initialization data gets the non-sequenced frames (SIF, IDF, ITF) from the processor. Functions of these frames and the exchange sequence are explained below:

Request Initialization Frame RIF

This frame is generated in the station requesting a remote IPL, contains no data, and has a broadcast address as destination address. Thus all stations will examine it, but only a station designated as IPL Source (by jumper) will accept the RIF. As the RIF is a non-sequenced frame, it will be passed to the processor. If there are plural stations, a check will be made in an association table whether the origin address identifies an IPL Acceptor Station that is assigned to the respective IPL Source. If yes, a procedure is started in the processor to generate SIF, IDF and ITF frames addressed to the requesting station, and prepare the IPL data to be shipped with IDF frames.

The requesting station will expect an SIF after it transmitted an RIF. If it receives any other type frame directed to it, such frame will be ignored and another RIF will be generated and transmitted.

Set Initialization Frame SIF:

An IPL Source Station upon recognizing that it must provide IPL to a remote station, will first transmit one SIF frame addressed to a requesting IPL Acceptor. (There may be a broadcast SIF if all stations have to be initialized). SIF contains no data.

The addressed station, when it is a Slave IPL Acceptor in NIM or NOM mode, or a Peer IPL Acceptor in NIM mode, will decode the SIF control byte and then immediately go into initialization or "IPL active" mode and prepare its Channel Interface Controller and the host processor for accepting the IPL data that will soon arrive. Any other current activity in the accepting processor will be stopped.

If the station to which the SIF is addressed is a Peer IPL Acceptor in NOM mode, i.e. if it has been previously loaded with initial program data, the frame will be treated as a normal nonsequenced frame, i.e. its contents will be passed to the host processor. There it will be analyzed, and if the processor wants to accept an IPL, the station can be set into NIM mode at an appropriate time, which will cause the transmission of a Request Initialization Frame and subsequent acceptance of an SIF, as described above.

Initialization Data Frame IDF:

The IPL Source will thereafter transmit a sequence of IDF frames containing the IPL data in their INFO fields, which are addressed to the IPL Acceptor.

In the receiving station, the IPL data are transferred to those buffers in the Data Storage Array which are associated with the IPL Source Station providing these data. From the buffers, the data are immediately transferred to the processor storage. A start address for these IPL data is permanently available in the CIC and is rapidly issued when the station enters "IPL Active" mode.

Initialization Termination Frame ITF:

When all IPL data are transmitted, the IPL Source generates an ITF frame that contains no data and is addressed to the IPL Acceptor.

In the receiving station, this frame will cause termination of the IPL Active or initialization state and entering the NOM mode so that the host processor can resume (or start) its operation.

10. LINK MANAGER DETAILS AND OPERATION FOR REMOTE IPL

10.1 Circuitry for IPL Procedures

FIGS. 8A and 8B show some detail of the circuitry in the Link Manager that is used for the remote loading of IPL data in the present processor intercommunication system. These details are in Decoder Unit DEC 104, Work Queue Response and Encoder Unit ENC 106, and Remote IPL Control Unit IPL 110.

Initial Program Load IPL 110 comprises three jumper positions 171 (J1), 172 (J2), and 173 (J3). When the jumpers are installed, they will bring the respective output lines to a predetermined voltage level V. When J1 is installed line 127 indicates that the station is an IPL Source, and when J2 is installed line 128 indicates that the station is an IPL Acceptor, J1 and J2 are mutually exclusive. When J3 is installed, voltage V on line 129 indicates that the station is a Peer IPL Acceptor. When J3 is not installed, missing of voltage V on line 129 indicates that the station is a Slave IPL Acceptor.

Two latches 174 and 175 are provided for indicating NIM mode and IPL Active Status respectively. NIM latch 174 is set via OR gate 176 by a system reset signal on line 153, or by a set NIM signal which is furnished on line 138. IPL Active latch 175 is set by a "Set IPL Active" signal on line 139 which occurs when an SIF frame is received under certain conditions. Both latches are reset by a signal "ITF received" on line 140. Output signal "NIM mode" of latch 174 is furnished on line 126, and output signal "IPL Active" of latch 175 is furnished on line 130.

Decoder Unit DEC 104 comprises a C byte decoder 181 which is connected to output bus 111 of ISR 101 for receiving the control byte of each received frame that is addressed to the respective station. Control C byte decoder 181 has many output lines for control signals initiating actions in the Link Manager, and has also two pairs of output lines for the CS and CR counts.

In FIGS. 8A and 8B, only those output lines of C byte decoder 181 are shown which are of interest for the Remote IPL procedures. They are: SIF decode line 182 (set initialization), IDF decode line 183 (initialization data), ITF decode line 184 (initialization termination), and RIF decode line 185 (request initialization).

In DEC 104, an "RIF Trigger" signal is developed on line 186 by a combination of AND gates and inverters. AND gate 187 has as inputs NIM signal line 126 and IPL Acceptor indicator line 128 from IPL 110. AND gate 188 has inputs through inverters 189 and 190 from C byte decoder 181 over SIF decode line 182 and from IPL 110 over IPL Active line 130, respectively. Outputs of AND gates 187 and 188 are combined in AND gate 191. One input of AND gate 192 is controlled by the output of AND gate 191, the other input is connected to the Start Inbound Frame signal line 134 from the Modem. Thus, an RIF trigger signal is activated on line 186 upon receipt of an inbound frame, but only when the station is in NIM mode, is an IPL Acceptor, the IPL load procedure is not yet active, and the frame received was not an SIF.

Two coder units are provided in DEC 104. Coder 201 has inputs from several lines, one of which is the RIF trigger line 186. It furnishes 5-bit code combinations on lines 135 (OL/CIC request code) to ENC 106 which generates inputs for the Work Queue. Coder 202 also has inputs from several lines of which one is RIF trigger line 186. It furnishes 4-bit code combinations on lines 137 (local status code) to FUN 108 for transfer to the Work Queue. Both coders are also connected to modulo-20 byte count lines 133, for stepping them through a frame cycle sequence.

The signal "Set IPL Active" on line 139 is also developed in DEC 104 by a combination of logic gates. AND gate 211 has as inputs the NIM signal on line 126 and the IPL Peer Acceptor indicator signal on line 129. AND gate 212 has as inputs the IPL Acceptor indicator signal on line 128 and the inverted IPL Peer Acceptor indicator signal, which is equivalent to an IPL Slave Acceptor indicator signal, from inverter 213. Outputs of both AND gates are combined in OR gate 214, the output of which is connected to one input of AND gate 215. The other input to AND gate 215 is SIF decode signal line 182. Thus, the output signal of AND gate 215 on line 139 is activated when an SIF (set initialization) is received, but only if the station is a Slave IPL Acceptor, or if it is a Peer IPL Acceptor in NIM mode.

In DEC 104, a signal "Trigger IPL Sequence" is developed by an AND gate 221 on line 222. The AND gate inputs are connected to RIF decode line 185 from C byte decoder 181, and to the IPL Source indicator line 127 from IPL 110. The signal will be active only in an IPL Source station when an RIF was received. It is transferred to one of the inputs of coder 201 to cause a coded request for an IPL procedure to ENC 106 and from there to the Work Queue and CIC.

Control line 139 "Set IPL Active", IDF decode line 183, and ITF decode line 184 are also each connected to one input of coder 201 for causing a different coded request on lines 135 to ENC 106 for an input to the CIC Work Queue. ITF decode line 184 is as well connected to IPL 110 over line 140 for resetting NIM latch 174 and IPL Active latch 175 when an Initialization Termination Frame is received.

In ENC 106, a code converter 225 is provided which has connected lines 135 from DEC 104 to its inputs. It also receives sequence control signals on lines 151 from SCT 105, and the mod. 20 byte count signals from UPD 103 on lines 133 for stepping it through a frame sequence. Output from code converter 225 is transferred via lines 156 (4 bit) and funnel 108 as input information to the Work Queue, and on lines 155 (2 bit) (not shown in FIGS. 8A and 8B) as control signals to the Work Queue.

10.2 Operation of the Station for Handling four IPL Frame Types Transmission of RIF:

When an IPL Acceptor Station in NIM mode receives any frame (except SIF), it generates an RIF trigger signal on line 186 which results in transfer of a coded request from coder 201 to ENC 106. In a sequence of steps, code converter 225 in ENC 106 and coder 202 in DEC 104 each provide 4-bit groups on lines 137 and 156, respectively which are combined in funnel 108 and transferred as an entry into the Outbound Work Queue. The necessary broadcast address (as destination address) and RIF control byte (1100/0010) for a Request Initialization Frame are generated this way.

Following the Work Queue entry and responsive thereto, the Link Manager prepares transmission of an outbound frame and raises a transmit request signal on line 157 to modem 20. When the next available frame passes the station, the broadcast address and the RIF control byte will be transferred from WQ via OSR 102 to the modem and the link. The modem will enter the station's address as OA, but the frame will not contain any data.

This generation and transmission of an RIF, without any assistance from CIC or host processor (because they are not yet operating), will be repeated each time a frame is received which is not the expected SIF frame.

Reception of Request Initialization Frame RIF

Because of the broadcast address, each station will analyze the RIF and generate a respective RIF decode signal on line 185. This will, however, result in a "Trigger IPL Sequence" signal only in an IPL Source Station (Jumper J1 installed). The trigger signal will cause coder 201 to transfer a coded request to ENC 106 which, in code converter 225, generates the necessary CIC command which is transferred on lines 156 to the CIC Work Queue. The origin address of the requesting station, which was transferred to ADR 107, will cause the appropriate channel identification SCID to be sent through funnel 108 into the CIC Work Queue. The Channel Interface Controller, when arriving at this entry, sends command information and the origin address to the host processor, as usual for N/S frames.

The processor will check whether it is the appropriate IPL Source for the respective origin address by consulting an association table. If the check result is positive, an IPL sequence is started in the processor for sending an SIF, several IDFs containing data, and an ITF to the requesting station. These frames being N/S frames, they are generated by the processor and the CIC.

Transmission of Set Initialization Frane SIF:

In the IPL Source station, the processor enters the SIF control byte (1100/0001) and the requesting station's address as destination address into a device control block DCB and issues this with a respective command to the I/O Channel. The CIC enters the DCB into CSA in the subchannel area assigned to the requesting station (Words WD 08 . . . WD 15). It then generates an entry for the Outboard Work Queue, comprising the SIF control byte and the destination address.

The Link Manager, when encountering this entry in its work queue, will enter these two bytes into the next available frame (no data in INFO field) for transmission over the link.

Reception of Set Initialization Frame SIF:

In the requesting station to which the SIF is addressed, decoding of the SIF control byte will raise the "Set IPL Active" signal on line 139, which then will set the IPL Active latch 175, and will further cause a coded output from coder 201 on lines 135. Code converter 225 will convert this to a CIC command "SIF received" (1010) which is placed into the CIC Work Queue. A subchannel identification, derived from the origin address (IPL Source address) in ADR 107, is also entered into the CIC WQ entry. This information, when taken up by the CIC, will cause preparation for IPL data acceptance by stopping any processor activity and issuing a processor memory start address for the IPL data.

To accelerate this preparation for IPL data acceptance, the output signal of IPL Active latch 175 could be directly transferred on line 130 into the CIC to cause setting of a latch and hardwired triggering of the necessary actions.

Transmission of Initialization Data Frame IDF:

IDF frames are prepared via DCB and Outbound WQ entry the same way as the SIF (but the control byte now being 1100/0000). Additionally, however, the required IPL data are transferred in 16-byte blocks from processor memory via the I/O Channel and the CIC into alternating buffers 0 and 1 of the respective subsection (assigned to requesting station) in DSA 26.

The Link Manager will enter the IDF control byte, requesting station's address as DA, and 16 IPL data bytes into successive available frames.

Reception of Initialization Data Frame IDF:

Decoding of IDF control byte in the receiving station results in a respective entry (CIC command 1011 or 1100) in the CIC WQ, to which an SCID corresponding to the IPL Source station's address is attached (from ADR 107). The 16 IPL data bytes received by the IDF frame are transferred to the respective subchannel subsection in Data Storage Array DSA 26. The Channel Interface Controller, in response to the WQ entry, will extract the 16 IPL data bytes from the DSA buffer and transfer it through the I/O Channel into the processor memory at the location designated by the prepared address. (This address is increased with each received IDF by an amount corresponding to 16 bytes).

Transmission of Initialization Termination Frame ITF:

When the IPL Source station recognizes the end of the IPL data sequence, it enters the ITF control byte (1100/0011) into the DCB, and an Initialization Termination Frame is generated and furnished to the link by the CIC, Link Manager and Modem of the IPL Source station in a similar way as the other frames (however, no data entered into INFO field).

Reception of Initialization Termination Frame ITF:

In the requesting station, decoding of the ITF control byte will result in resetting NIM latch 174 and IPL Active latch 175. A CIC command for ITF (1101) is entered into the WQ. When this entry is handled by the CIC, it will cause both Channel Interface Controller and host processor to enter into Normal Operating Mode NOM.

If the receiving station is a Peer IPL Acceptor, it will then no longer obey Set Initialization Frames because AND gates 211 and 215 are closed (NIM signal inactive). If it is, however, a Slave IPL Acceptor station, each SIF addressed to it (by individual station address or by a broadcast address) will cause setting of the IPL Active latch and preparation of CIC and host processor for accepting the IPL data subsequently following in IDF frames.

Broadcasting Remote Initial Program Load IPL:

An IPL Source station can of course simultaneously load all processors in the system which are attached to IPL Acceptor stations by first transmitting—without having received a Request Initialization Frame—an SIF containing a broadcast address, followed by IDF frames and an ITF frame also containing a broadcast address.

This Broadcast Initial Program Load will, however, not automatically be accepted by Peer IPL Acceptor stations in NOM mode. Such stations could request afterwards, controlled by the attached processor, the intended IPL by transmitting an RIF. For this purpose, the attached processor loads—through the CIC—zeros into the first two bits (SS) of all Station State Fields in the CSA. Subsequent accessing of any SSF in response to reception of an inbound frame will cause activation of the "set NIM" signal on output line 138 of DEC 104 which monitors contents of SSF's. The NIM state will then cause automatically transmission of an RIF (as described above).

We claim:

1. An initialization arrangement for a communications system having a communications link and a plurality of processors, each of said processors having at least one Input/Output I/O channel and each of said processors requiring program initialization data provided by way of an initial program load IPL operation, said processors being respectively predesignated as IPL source processors that provide IPL data and IPL acceptor processors that receive IPL data from an IPL source processor to which said IPL acceptor processors are assigned, said system comprising:

a corresponding plurality of stations interconnected by way of said communications link, each of said stations being attached to a respective one of said processors via its associated I/O Channel for controlling transfer of command and data information between said processors over said communications link, such information being arranged in accordance with a variety of information frames, and each of said stations incorporating a modem connected to said communication link, said modem handling technology-dependent functions including information coding and modulation, link drive and receive, frame synchronization and data insertion, clock extraction, frame and data checking at the link level, and link initialization and available frame insertion, and the like, a link manager, said link manager connected to said modem providing logical frame management functions such as frame structuring, address decode and encode, control field encode and decode, data blocking and deblocking, physical interface protocol sequencing and checking, and data pacing, and the like, a storage section connected to said link manager, said storage section incorporating a control storage array including a respectively assigned storage subsection for each station in the system for storing control information for the respective stations, said storage section further incorporating a data storage array, including a respectively assigned storage subsection for each station in the system for storing data for the respective stations, said storage section further incorporating a work queue storage for storing work queues, and a channel interface controller connected to said storage section, said channel interface controller providing interfacing for its station with its respective processor I/O channel, said channel interface controller providing an individual subchannel for communication with the individual stations in said system and further providing facilities for synchronizing with the channel I/O interface for data transfer, presenting the station logic interface to the processor, multiplexing control required among the subchannels, and device address mapping between its respective processor I/O Interface and the station address;

initialization circuitry at each of said stations, said circuitry including means for monitoring its respectively associated processor to determine when an initial program load operation is required by its attached processor when operating as an IPL acceptor processor, said circuitry including means for generating and transmitting upon determination of such requirement a general broadcast Request Initialization frame RIF for requesting initialization from an individual one of said processors operating as an IPL source processor, said circuitry at each station including means for detecting Request Initialization frames from any other station on said link and upon receipt of a said Request Initialization frame to determine if its attached processor is assigned to serve as said IPL source processor for said requesting IPL acceptor processor for transmission of IPL data, and IPL transmission means at each station for thereupon transmitting to transmit an IPL frame sequence including a Set Initialization frame SIF, a plurality of Initialization Data frame IDF containing initialization data from its attached IPL source processor, and an Initialization Termination frame ITF to provide complete initialization of said requesting IPL acceptor processor.

2. A communication system in accordance with claim 1 wherein said plurality of stations is serially interconnected by a communications loop and further comprising in each station:

mode means at each station for conditioning said station and providing signals indicative of (1) a Normal Operating Mode NOM for normal transmittal and receipt of message frames and (2) a Non-Intelligent Mode NIM wherein said station requires initialization;

means responsive to a signal from said mode means indicative of a Non-Intelligent Mode at said station for generating said Request Initialization frame when any frame other than a Set Initialization frame is received by said station, and means at said station for transmitting said generated Request Initialization frame over said communications loop.

3. A communications system according to claim 1, additionally comprising in each station:

indicating means at each station for generating signals indicating whether a processor attached to said station has initialization data available, and means responsive to signals from said indicating means for generating control signals for controlling operation of said initialization circuitry to detect receipt of a Request Initialization frame from any remote processor, to recognize assignment to said station and for starting the sequence of IPL frames for initialization of said remote processor from said station.

4. A communications system according to claim 1, additionally comprising in each station:

status means for providing status signals upon station malfunction, power on and other predetermined conditions for generating signals to indicate that the processor attached to said station requires remote initialization, said initialization circuitry being responsive to status signals from said status means to initiate generation of a said Request Initialization frame.

5. A communications system according to claim 4, further comprising:

additional status means at each station to provide signals for indicating whether the status of the respective station is an initialization source station or an initialization acceptor station, and for indicating whether any acceptor station is (1) a slave acceptor station that must accept any initial program load transmitted to it, or (2) a peer acceptor station that will accept an initial program load only on an optional basis such as when such peer acceptor station has previously requested said initial program load, and means responsive to signals from said additional status means and to the receipt of a Set Initialization frame from a remote station in the case of a slave acceptor station to operate the station for accepting subsequent Initialization Data frames and for transferring the initialization data to the attached processor, and in the case of a peer acceptor station to only notify the attached processor of the receipt of said Set Initialization frame, for determination by said processor of action required responsive thereto.

6. A communications system in accordance with claim 1 wherein each of said IPL source processors includes an assignment table indicating the addresses of those stations and IPL acceptor processors to which the respective IPL source processor is exclusively assigned for providing initialization data, said system further comprising:

transmit means at each of said stations operable when an initial program load IPL is required by its attached processor operating as an IPL acceptor processor for activating such station as a requesting station and for transmitting a Request Initialization frame which is addressed in a broadcast mode to all other stations in said system and which also includes an origin address identifying the transmitting station;

receiving means at each of said stations to which an IPL source processor is attached for receiving said Request Initialization frame including said origin address transmitted from any other station and its attached acceptor processor in said system and for comparing said origin address to the addresses in the assignment table, its attached IPL source processor and operable upon a successful compare operation between the transmitted origin address and a matching address in said assignment table for transmitting said IPL frame sequence for initialization of said requesting processor.

* * * * *

UNITED STATES PATENT AND TRADEMARK OFFICE
CERTIFICATE OF CORRECTION

PATENT NO. : 4,335,426
DATED : June 15, 1982
INVENTOR(S) : Hiram M. Maxwell et al It is certified that error appears in the above—identified patent and that said Letters Patent is hereby corrected as shown below:

In Claim 1, column 38, lines 3 and 4 should read

"each station for thereupon transmitting an IPL frame sequence. . ."

Signed and Sealed this

Twelfth Day of October 1982

[SEAL]

Attest:

Attesting Officer

GERALD J. MOSSINGHOFF

Commissioner of Patents and Trademarks